(12) United States Patent
Wakazono et al.

(10) Patent No.: US 8,582,923 B2
(45) Date of Patent: Nov. 12, 2013

(54) IMAGE PROCESSING APPARATUS, IMAGE PROCESSSING METHOD, AND PROGRAM

(75) Inventors: Masafumi Wakazono, Kanagawa (JP); Tomoo Mitsunaga, Kanagawa (JP)

(73) Assignee: Sony Corporation (JP)

( * ) Notice: Subject to any disclaimer, the term of this patent is extended or adjusted under 35 U.S.C. 154(b) by 230 days.

(21) Appl. No.: 12/932,831

(22) Filed: Mar. 8, 2011

(65) Prior Publication Data

US 2011/0235945 A1    Sep. 29, 2011

(30) Foreign Application Priority Data

Mar. 24, 2010   (JP) ................................ P2010-068156

(51) Int. Cl.
*G06K 9/32*   (2006.01)

(52) U.S. Cl.
USPC .......................................................... 382/300

(58) Field of Classification Search
None
See application file for complete search history.

(56) References Cited

U.S. PATENT DOCUMENTS

| | | | |
|---|---|---|---|
| 5,930,396 A * | 7/1999 | Fiala et al. ..................... | 382/237 |
| 5,953,691 A * | 9/1999 | Mills ............................. | 702/198 |
| 6,965,416 B2 | 11/2005 | Tsuchiya et al. | |
| 7,570,390 B2 | 8/2009 | Mitsunaga | |
| 7,899,266 B2 | 3/2011 | Mitsunaga | |
| 2001/0045988 A1 * | 11/2001 | Yamauchi et al. ............ | 348/273 |
| 2008/0123950 A1 | 5/2008 | Matsushita et al. | |

FOREIGN PATENT DOCUMENTS

| | | |
|---|---|---|
| EP | 2131569 A1 | 12/2009 |
| JP | 2001-275015 A | 10/2001 |
| JP | 2004-221645 A | 8/2004 |
| JP | 2007-049540 A | 2/2007 |
| JP | 2008-113222 A | 5/2008 |
| JP | 2008-131529 A | 6/2008 |
| JP | 2008-148180 A | 6/2008 |
| JP | 2009-177558 A | 8/2009 |

* cited by examiner

*Primary Examiner* — Tsung-Yin Tsai
(74) *Attorney, Agent, or Firm* — Lerner, David, Littenberg, Krumholz & Mentlik, LLP

(57) ABSTRACT

An image processing apparatus includes: a representative value calculation unit calculating a representative value from an input first image signal; an interpolation unit interpolating the representative value calculated by the representative value calculation unit using a second image signal input after the first image signal; and an adjustment processing unit blending the interpolated image signal and the second image signal so that an output ratio of the image signal interpolated by the interpolation unit is smaller when a variation amount of an image corresponding to the second image signal with respect to an image corresponding to the first image signal is large in comparison to a case when the variation amount is small.

8 Claims, 24 Drawing Sheets

IMAGE PROCESSING APPARATUS, IMAGE PROCESSSING METHOD, AND PROGRAM

CROSS-REFERENCE TO RELATED APPLICATION

The present application claims priority from Japanese Patent Application No. JP 2010-068156 filed in the Japanese Patent Office on Mar. 24, 2010, the entire content of which is incorporated herein by reference.

BACKGROUND OF THE INVENTION

1. Field of the Invention

The present invention relates to an image processing apparatus, an image processing method, and a program, and more particularly, to an image processing apparatus, an image processing method, and a program capable of preventing an image from being broken down due to a difference between an image at a first pass and an image at a second pass in a configuration of two passes.

2. Description of the Related Art

When pixels in an image are processed in image signal processing, information regarding a wide range near the processed pixels is used. For example, in the calculation of a bilateral filter used in HDR (high dynamic range) compression processing, information regarding a range of several hundreds of pixels which are within the radius of the processed pixels is used.

In the image signal processing of using this wide range information, calculation cost for each pixel tends to increase. That is, since the size of hardware or calculation time of software increases, it is difficult to perform the image signal processing at one step.

In order to realize signal processing of using a wide range of information, the processing is divided into a plurality of steps to reduce the calculation cost in many cases. For example, in order to reduce the calculation cost, the calculation of the bilateral filter is divided into two steps: a step of generating intermediate data by calculating a pair of representative values from the wide range of information and a step of performing processing for each pixel using the representative values.

The above-described two-step configuration is disclosed in Japanese Unexamined Patent Application Publication No. 2001-275015 (corresponding to U.S. Pat. No. 6,965,416) and Japanese Unexamined Patent Application Publication No. 2004-221645 (corresponding to U.S. Pat. No. 7,570,390). The bilateral filter is disclosed in Japanese Unexamined Patent Application Publication No. 2009-177558 (corresponding to European Patent Application Publication No. 2131569).

In general, in a bilateral filter BLF(pc) for an image, as indicated in Expression (1) below, pixel values I(p) of pixels around an important pixel position pc are added in a weighting function $\omega(p-pc)$ in a space direction and a weighting function $\phi(I(p)-I(pc))$ in a luminance value direction.

[Expression 1]

$$BLF(pc) = \frac{\sum_{p \in \Omega} \omega(p-pc) \cdot \phi(I(p)-I(pc)) \cdot I(p)}{\sum_{p \in \Omega} \omega(p-pc) \cdot \phi(I(p)-I(pc))} \quad (1)$$

The denominator on the right-hand side in Expression (1) indicates a normalization coefficient of a weighted value.

SUMMARY OF THE INVENTION

However, when processing is divided to reduce calculation cost, an error may occur in the processing in a case where there is no characteristic of an input signal at each step. This is because the condition in which "a series of processes for an image is divided into a plurality of steps" is not satisfied since the input image is varied at each step.

Image deterioration caused due to an error mainly occurs in a video processing system realizing real-time processing. In the video processing system, signal processing is continuously performed for each image frame. Since the processing is continuously performed, it is difficult to process an image again after intermediate data is generated for the image.

In the video processing, the intermediate data generated in the previous frame is used in correction processing. Then, the correction processing and the generation of the intermediate data can be simultaneously performed. However, deterioration in image quality may occur due to the above-described error when the intermediate data of the previous frame is used.

In a still image processing system, the deterioration in image quality may also occur due to the above-described error. For example, as disclosed in Japanese Unexamined Patent Application Publication No. 2009-177558 (corresponding to European Patent Application Publication No. 2131569), there is a signal processing system performing sensitivity gain processing or white balance processing before gray scale correction processing including a plurality of steps. In the signal processing system, when parameters of the sensitivity gain processing or the white balance processing are different from each other between the steps, signals input in the gray scale correction processing may become different.

In the still image processing, it may be the case that no error occurs by performing the process of a first step again after the parameter is changed. However, it takes some time to perform the process of the first step again.

Even when there is difference between the characteristics of the input signal between the steps, an influence of the characteristics on image quality is different. For example, in the above-described gray scale correction processing, the influence on the image quality is small in a variation occurring in a small region of an image in a difference between processing frames. However, the number of calculation errors may easily increase and the image quality may easily deteriorate particularly in a variation (for example, exposure (brightness of the entire screen) of a photographed image or the characteristic of a viewing angle (position of the entire screen)) occurring in a large region of the image in the difference between the processing frames.

Furthermore, for example, when the input signals are considerably different from each other between the first and second steps, unintended processing may be performed due to expansion of the number of errors and thus an image may be broken down.

In the bilateral filter, the number of calculation errors may increase to a fixed decimal fraction when the normalization coefficient of the weighted value of the denominator on the right-hand side in Expression (1) described above is extremely small. Even in this case, unintended processing may be performed due to the calculation error and thus an image may be broken down.

It is desirable to prevent the breakdown of an image.

According to an embodiment of the invention, there is provided an image processing apparatus including: representative value calculation means for calculating a representative value from an input first image signal; interpolation means for interpolating the representative value calculated by the representative value calculation means using a second image signal input after the first image signal; and adjustment processing means for blending the interpolated image signal and the second image signal so that an output ratio of the image signal interpolated by the interpolation means is smaller when a variation amount of an image corresponding to the second image signal with respect to an image corresponding to the first image signal is large in comparison to a case when the variation amount is small.

The image processing apparatus may further include adjustment amount determination means for determining an adjustment amount of the output ratio of the interpolated image signal and an output ratio of the second image signal according to a variation amount in the image corresponding to the second image signal with respect to the image corresponding to the first image signal. The adjustment processing means may blend the interpolated image signal with the second image signal according to the adjustment amount determined by the adjustment amount determination means.

The adjustment amount determination means may determine the adjustment amount of the output ratio of the interpolated image signal and the output ratio of the second image signal according to a variation amount level or coordinate of the image corresponding to the second image signal with respect to the image corresponding to the first image signal.

The representative value may be calculated from a block histogram and a block sum of products.

The adjustment determination means may determine the adjustment amount of the output ratio of the interpolated image signal and the output ratio of the second image signal according to a magnitude of a value of the block histogram.

According to another embodiment of the invention, there is provided an image processing method including the steps of: calculating a representative value from an input first image signal; interpolating the calculated representative value using a second image signal input after the first image signal; and blending the interpolated image signal and the second image signal so that an output ratio of the interpolated image signal is smaller when a variation amount of an image corresponding to the second image signal with respect to an image corresponding to the first image signal is large in comparison to a case when the variation amount is small.

According to still another embodiment of the invention, there is provided a program causing a computer to execute an image processing method including the steps of: calculating a representative value from an input first image signal; interpolating the calculated representative value using a second image signal input after the first image signal; and blending the interpolated image signal and the second image signal so that an output ratio of the interpolated image signal is smaller when a variation amount of an image corresponding to the second image signal with respect to an image corresponding to the first image signal is large in comparison to a case when the variation amount is small.

According to still another embodiment of the invention, a representative value is calculated from an input first image signal; the calculated representative value is interpolated using a second image signal input after the first image signal; and the interpolated image signal and the second image signal are blended with each other so that an output ratio of the image signal interpolated by the interpolation unit is smaller when a variation amount of an image corresponding to the second image signal with respect to an image corresponding to the first image signal is large in comparison to a case when the variation amount is small.

The image processing apparatus described above may be an independent apparatus or an internal block included in one image processing apparatus.

According to the embodiments of the invention, in the configuration of two passes, an image can be prevented from being broken down due to a difference between the image at the first pass and the image at the second pass.

DESCRIPTION OF THE PREFERRED EMBODIMENTS

Hereinafter, embodiments of the invention will be described with reference to the drawings. The description will be made in the following order.

1. First Embodiment (Overview of Embodiment of the Invention)
2. Second Embodiment (Example of Digital Video Camera)

1. First Embodiment
Overview of Embodiment of the Invention

Figure 1:
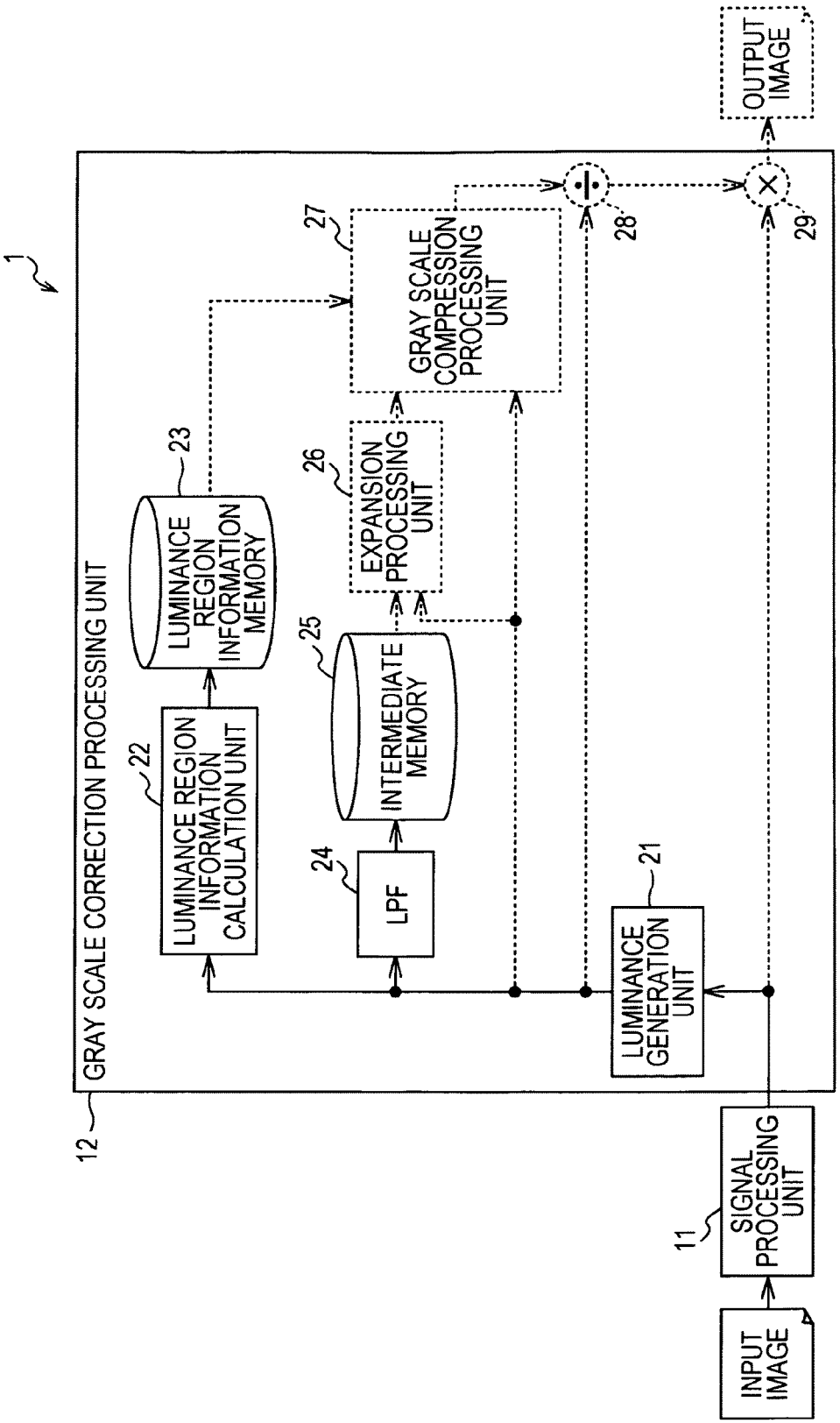
FIG. 1 is a block diagram illustrating a first pass operation of an image processing apparatus according to the related art.
Figure 2:
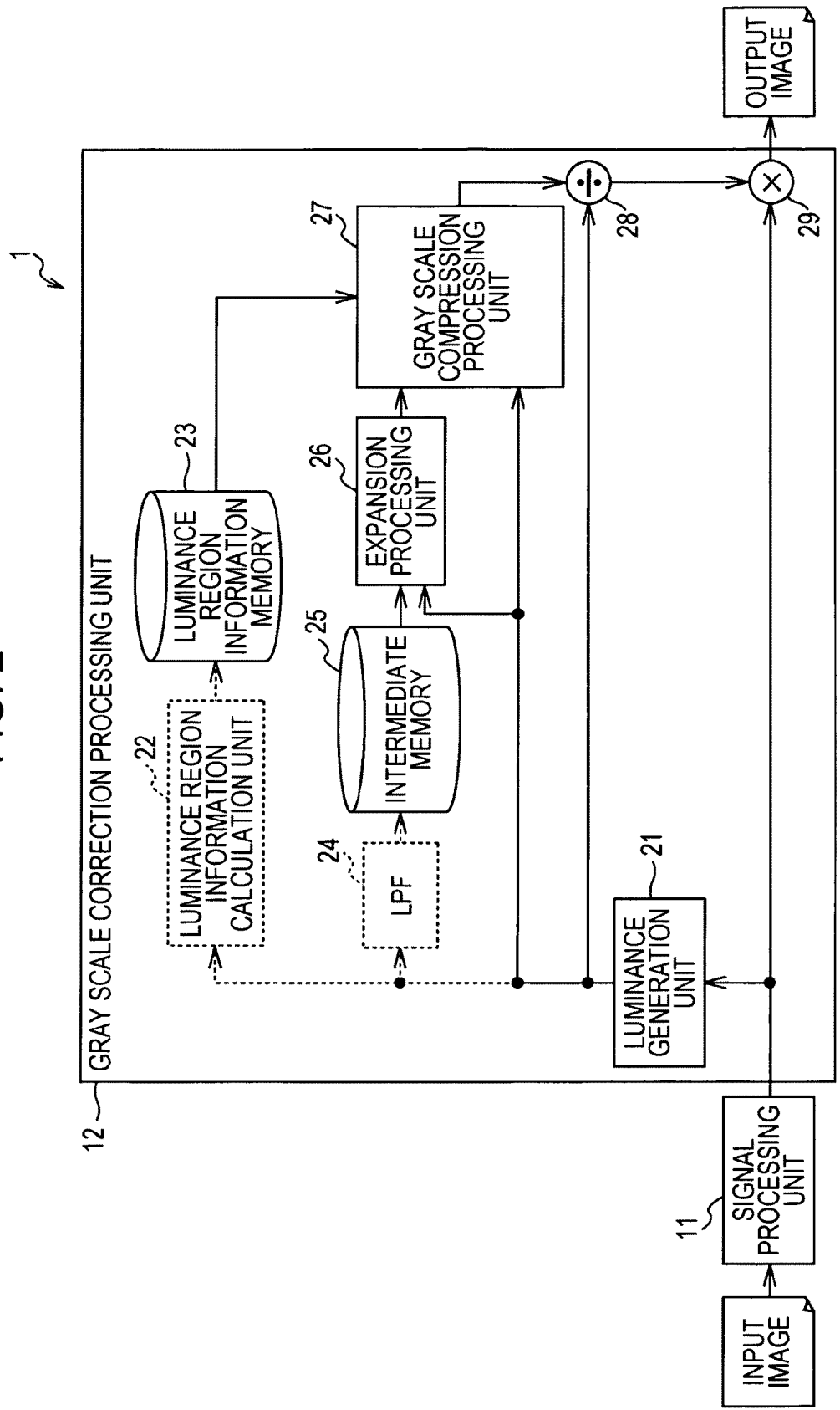
FIG. 2 is a block diagram illustrating a second pass operation of the image processing apparatus according to the related art.

First, the overview of an embodiment of the invention will be described with reference to FIGS. 1 to 3. In FIGS. 1 and 2, an exemplary configuration of an image processing apparatus 1 according to the related art is shown to make comparison with an image processing apparatus according to an embodiment of the invention. In FIG. 1, units which operate in a first pass are indicated by solid lines and units which do not operate in the first pass are indicated by broken lines. In FIG. 2, units which operate in a second pass are indicated by solid lines and units which do not operate in the second pass are indicated by broken lines.

The image processing apparatus 1 includes a signal processing unit 11 and a gray scale correction processing unit 12. The signal processing unit 11 performs predetermined signal processing on an input image and outputs the processed image to the gray scale correction processing unit 12.

The gray scale correction processing unit 12 performs gray scale correction processing on the input image from the signal processing unit 11 by two passes processing and outputs the output image to the rear stage. That is, the gray scale correction processing unit 12 performs sampling by generating intermediate data from the input image at a first pass and performs gray scale correction processing by correcting the intermediate data at a second pass.

The gray scale correction processing unit 12 includes a luminance generation unit 21, a luminance region information calculation unit 22, a luminance region information memory 23, an LPF (lowpass filter) 24, an intermediate memory 25, an expansion processing unit 26, a gray scale compression processing unit 27, a division unit 28, and a multiplication unit 29. The input image from the signal processing unit 11 is input to the luminance generation unit 21 and the multiplication unit 29.

The luminance generation unit 21 generates a Y signal (luminance signal) from RGB of the input image and outputs the generated Y signal and the input image to the luminance region information calculation unit 22 and the LPF 24 at the first pass. Moreover, the luminance generation unit 21 outputs the generated Y signal and the input image to the expansion processing unit 26, the gray scale compression processing unit 27, and the division unit 28 at the second pass.

The luminance region information calculation unit 22 calculates luminance region information as statistical information of an image used to determine the characteristics of gray scale correction from the luminance value of an image corresponding to one frame at the first pass and stores the calculated luminance region information in the luminance region information memory 23. The luminance region information memory 23 temporarily stores the luminance region information from the luminance region information calculation unit 22 and supplies the luminance region information to the gray scale compression processing unit 27.

The LPF 24 performs filtering processing on the luminance value of the image corresponding to one frame at the first pass and stores the intermediate data as the result of the filtering processing in the intermediate memory 25. For example, the filtering processing includes a process of thinning out the luminance value and smoothing the luminance value. That is, the number of pixels of the intermediate data subjected to the thinning is smaller than that of the input image, and thus the intermediate data can be said to be a representative value. The intermediate memory 25 temporarily stores the intermediate data from the LPF 24 and supplies the intermediate data to the expansion processing unit 26.

The expansion processing unit 26 expands the intermediate data stored in the intermediate memory 25 using the input image from the luminance generation unit 21 at the second pass and supplies an image with the expanded intermediate data to the gray scale compression processing unit 27. That is, in the expansion processing unit 26, the intermediate data is interpolated by an interpolation filter and thus an image with the same number of pixels as that of the input image is generated.

The gray scale compression processing unit 27 compresses the gray scales of the image which is the intermediate data expanded from the expansion processing unit 26 with reference to the luminance region information of the luminance region information memory 23 at the second pass. The gray scale compression processing unit 27 outputs the processed data to the division unit 28.

The division unit 28 calculates a ratio (gain) between the luminance value from the luminance generation unit 21 before gray scale compression and the luminance value from the gray scale compression processing unit 27 after the gray scale compression at the second pass, and then supplies the calculated gain to the multiplication unit 29. The multiplication unit 29 multiplies the RGB of the input image from the signal processing unit 11 by the gain from the division unit 28 at the second pass, and then outputs the gray-scale-compressed output image to the rear stage.

In principle, when an image at the first pass is different from an image at the second pass, performance may deteriorate due to calculation error. Specifically, when a viewing angle is varied between the image at the first pass and the image at the second pass, the space characteristic of a filter may be shifted due to calculation error and thus deterioration (for example, HALO which is the phenomenon in which halo is covered) may occur due to erroneous correction on the output image.

Moreover, when a luminance is varied between the image at the first pass and the image at the second pass, the output level of the filter is shifted due to the calculation error, the characteristic of the gray scale compression deviates, and thus an expected level of the output image may not be obtained.

The variation (difference) in the luminance or the viewing angle can be said to be a variation in the phase of the interpolation filter in the gray scale compression processing unit 27. When such a variation is too large, the output image may not only deteriorate but also may be broken down. According to the embodiment of the invention, in order to solve this problem, the data of the intermediate memory at the first pass is not used and the signal is replaced so that only the signal at the second pass is used, as shown in FIG. 3, when the variation amount of the luminance or the viewing angle of the image at the second pass with respect to the image at the first pass is too large.

Figure 3:
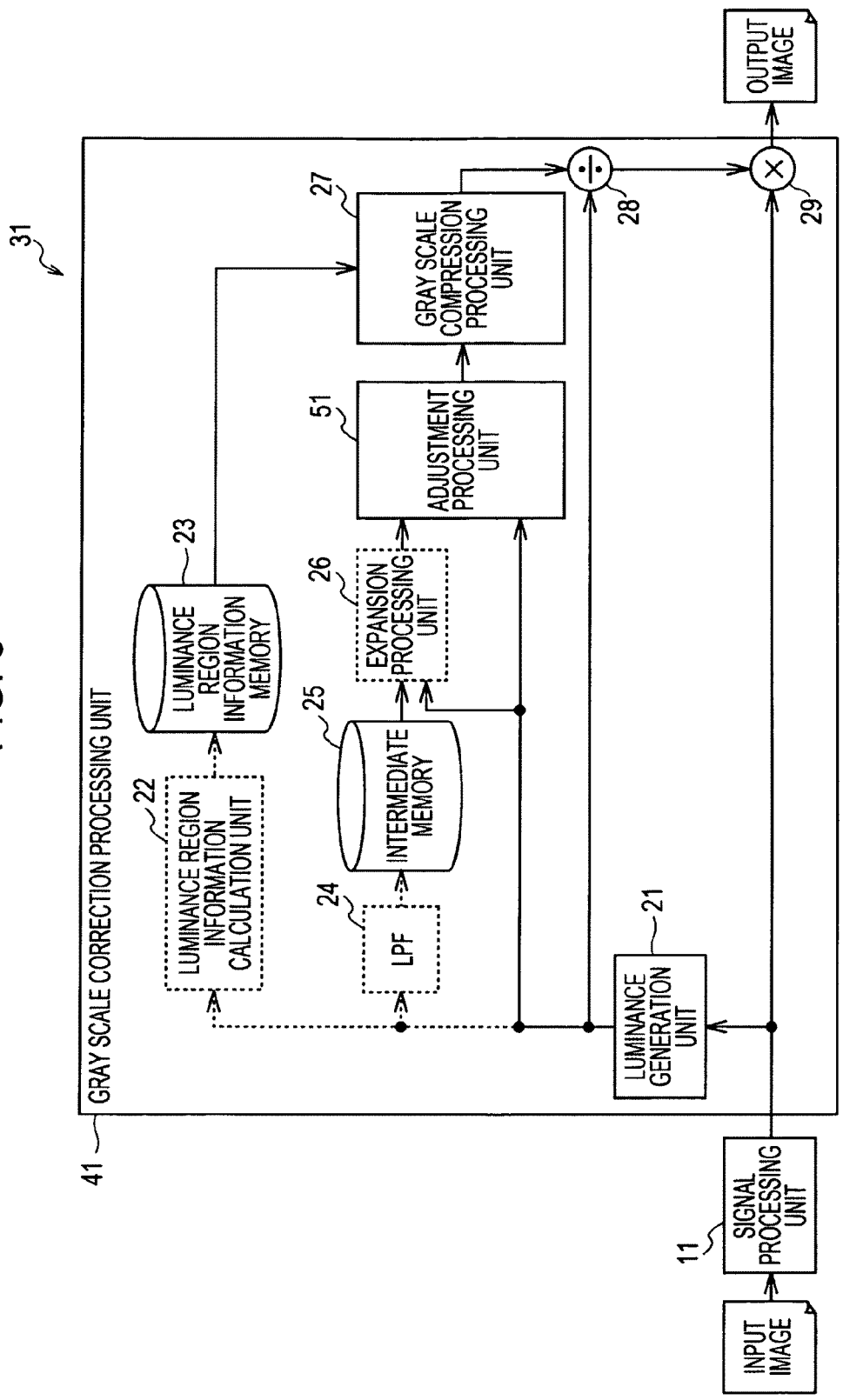
FIG. 3 is a block diagram illustrating an exemplary configuration of an image processing apparatus according to embodiments of the invention.

FIG. 3 is a block diagram illustrating an exemplary configuration of an image processing apparatus according to the embodiment of the invention. An image process apparatus 31 in FIG. 3 is different from the image processing apparatus 1 in FIG. 1 in that the gray scale correction processing unit 12 is replaced by a gray scale correction processing unit 41. In addition, the image processing apparatus 31 includes the signal processing unit 11 as in the image processing apparatus 1 in FIG. 1.

The gray scale correction processing unit 41 is different from the gray scale correction processing unit 12 in FIG. 1 in that the gray scale correction processing unit 41 further includes an adjustment processing unit 51. As in the gray scale correction processing unit 12 in FIG. 1, the gray scale correction processing unit 41 includes the luminance generation unit 21, the luminance region information calculation unit 22, the luminance region information memory 23, the LPF 24, the intermediate memory 25, the expansion processing unit 26, the gray scale compression processing unit 27, the division unit 28, and the multiplication unit 29.

That is, the Y signal and the input image from the luminance generation unit 21 are output to the luminance region information calculation unit 22 and the LPF 24 at the first pass, whereas the Y signal and the input image are input to the expansion processing unit 26, the adjustment processing unit 51, and the division unit 28 at the second pass.

The image which is the intermediate data expanded by the expansion processing unit 26 is also input the adjustment processing unit 51 at the second pass. The adjustment processing unit 51 blends the image which is the expanded intermediate image and the input image from the luminance generation unit 21 at an output ratio corresponding to the degree of the variation amount of the luminance or the viewing angle of the image at the second pass with respect to the image at the first pass, and then outputs the blended image to the gray scale compression processing unit 27.

For example, when the variation amount of the luminance or the viewing angle of the image at the second pass with respect to the image at the first pass is too large, the output ratio of the image which is the expanded intermediate data is considered to be 0 and only the image at the second pass is output to the gray scale compression processing unit 27. In this case, since the gray scale compression processing unit 27 performs a simple tone curve process, the image can be prevented from being broken down due to the large variation amount of the luminance or the viewing angle of the image at the second pass with respect to the image at the first pass.

On the other hand, for example, when the variation amount of the luminance or the viewing angle of the image at the second pass with respect to the image at the first pass scarcely occurs, the output ratio of the image at the second pass is considered to be 0 and only the image which is the expanded intermediate data is output to the gray scale compression processing unit 27. That is, the gray scale compression processing unit 27 uses the expanded intermediate data and performs the gray scale compression, as in the related art.

The gray scale compression processing unit 27 compresses the gray scales of the image from the adjustment processing unit 51 at the second pass with reference to the luminance region information of the luminance region information memory 23, and then outputs the processed data to the division unit 28.

Thus, since the images are output to the gray scale compression processing unit 27 according to the variation in the luminance or the viewing angle of the images at the first pass and the second pass, that is, the images are blended at the ratio of the images used in the gray scale compression processing unit 27, the image can be prevented from being broken down due to the large variation in the luminance or the viewing angle of the images at the first pass and the second pass.

A method of determining an adjustment amount of the output ratio in the above-described adjustment processing unit 51 in FIG. 3 includes a method of determining a viewing angle, for example, by calculating the viewing angle from the output of a gyro sensor or calculating a motion vector of an input image through image analysis. As for brightness, for example, there may be used a method of determining brightness by calculating the brightness from a variation amount of exposure control between frames.

For example, when an abrupt variation in brightness such as emitting of flash or an abrupt variation in a viewing angle by fast panning is detected, the images are blended so that only the image at the second pass is output to the gray scale compression processing unit 27. For example, even when the denominator on the right-hand side in Expression (1) of the above-described bilateral filter becomes smaller and deterioration in the calculation precision is detected, the images are blended so that only the image at the second pass is output to the gray scale compression processing unit 27.

Hereinafter, a specific configuration will be described to realize the embodiment of the invention. The first pass and the second pass described above are appropriately also called a first step and a second step, respectively.

2. Second Embodiment

Exemplary Configuration of Digital Camera

Figure 4:
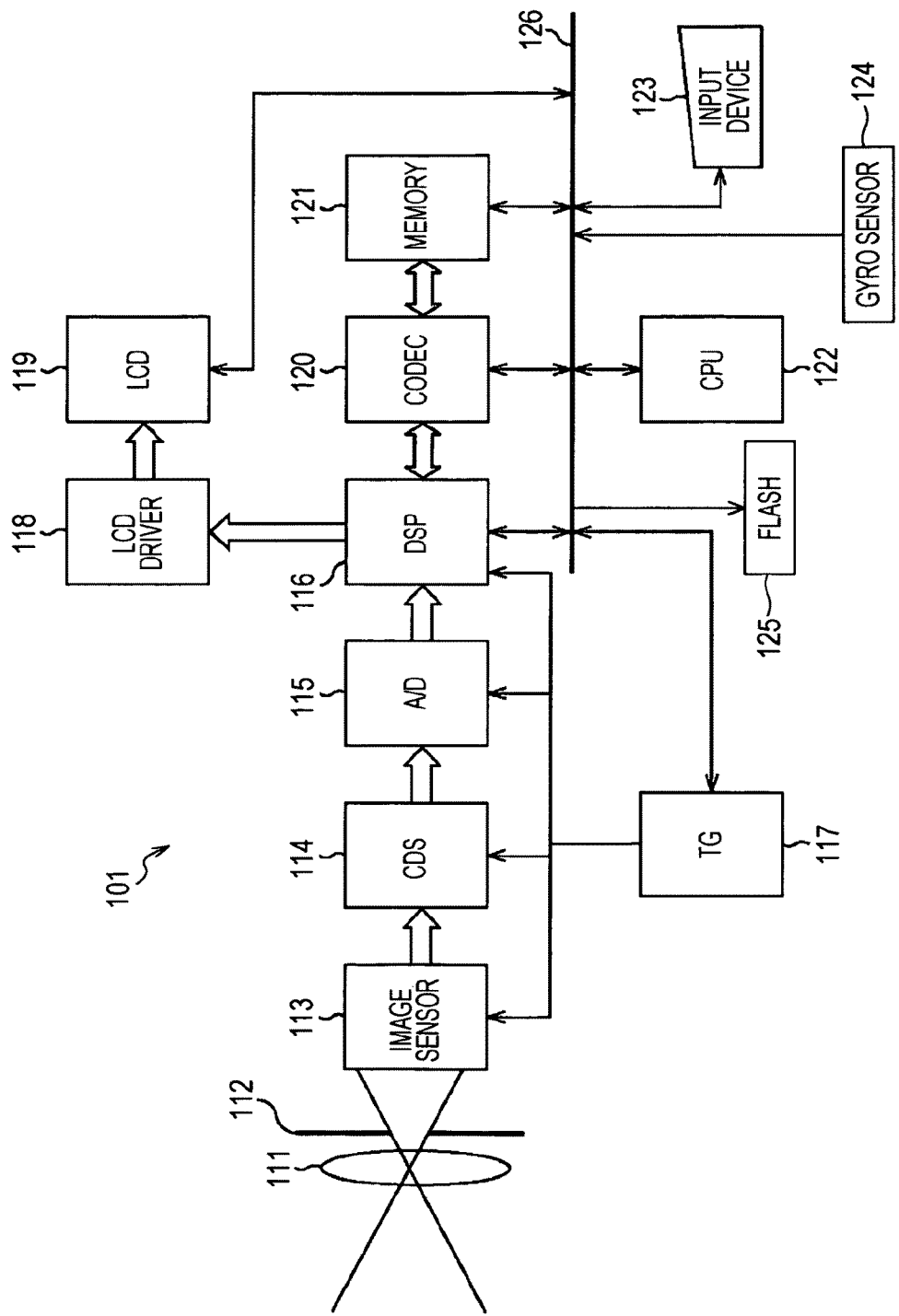
FIG. 4 is a block diagram illustrating an exemplary configuration of a digital camera according to an embodiment of the invention.

FIG. 4 is a block diagram illustrating an exemplary configuration of a digital video camera serving as an image processing apparatus according to an embodiment of the invention. The digital video camera 101 includes a lens 111, diaphragm 112, an image sensor 113, a correlated double sampling circuit (CDS) 114, an A/D (Analog/Digital) converter 115, a DSP (Digital Signal Processor) block 116, a timing generator (TG) 117, an LCD (Liquid Crystal Display) driver 118, an LCD 119, a CODEC (Compression/Decompression) 120, a memory 121, a CPU (Central Processing Unit) 122, an input device 123, a gyro sensor 124, a flash 125, and a bus 126. The DSP block 116 is a block including a processor (for example, SDP) for signal processing and a memory such as a RAM (Random Access Memory) storing image data. The digital video camera 101 performs image processing described below when the processor executes a predetermined program. Hereinafter, the DSP block 116 is simply referred to as the DSP 116.

Incident light from a subject passes through an optical system formed by the lens 111, the diaphragm 112, and the like and reaches each light-receiving element on an imaging surface of the image sensor 113. Then, the incident light is converted into an electric signal by photoelectric conversion of the light-receiving element. Noise is removed from the electric signal output from the image sensor 113 by the correlated double sampling circuit 114. Then, after the electric signal is digitized by the A/D converter 115, the digitized image data is temporarily stored in the memory of the DSP 116. The timing generator 117 controls a signal processing system including the correlated double sampling circuit 114, the A/D converter 115, and the DSP 116 so that the image data is received at a given frame rate. That is, a stream of the image data is supplied at the given frame rate to the DSP 116.

The image sensor 113 has a wider dynamic range than that of an image sensor such as a general CCD (Charge Coupled Device) and is capable of imaging a dark portion to a bright portion of a subject without being saturated or generating noise. Therefore, the A/D converter 115 converts the input electric signal into image data with the number of gray scales more than the number of gray scales of a general digital video camera. That is, the number of gray scales of a general digital video camera is the number of gray scales which can be expressed by data of about 10 bits to about 12 bits. The number of gray scales more than the number of gray scales of a general video camera is the number of gray scales which can be expressed by data of about 14 bits to about 16 bits.

The DSP 116 performs image processing, which is described below, on image data, so that the dynamic range of the image becomes a dynamic range which can be displayed by the LCD 119, and then supplies the processed image data to the LCD driver 118 or the CODEC 120, as necessary.

The LCD driver 118 converts the image data supplied from the DSP 116 into an analog image signal. The LCD driver 118 supplies the analog image signal to the LCD 119 which is a viewfinder of the digital video camera so that an image is displayed based on the image signal.

The CODEC 120 encodes the image data supplied from the DSP 116 according to a predetermined scheme and stores the encoded image data in a memory 121 formed by a semiconductor, a magnetic recording medium, a magneto-optical recording medium, an optical recording medium, or the like.

The CPU 122 controls entire processing of the digital video camera based on an instruction or the like input, for example, when a user operates the input device 123 including an operation button such as a shutter button. The DSP 116, the timing generator 117, the CODEC 120, the memory 121, the LCD 119, the CPU 122, and the input device 123 are connected to each other via the bus 126.

The gyro sensor 124 detects information, such as speed, an angle, angular speed, acceleration, or magnetism indicating a slope of the digital camera and outputs the CPU 122 or the DSP 116 via the bus 126. The flash 125 emits flash light under the control of the CPU 122 via the bus 126.

Exemplary Function Configuration of DSP

Figure 5:
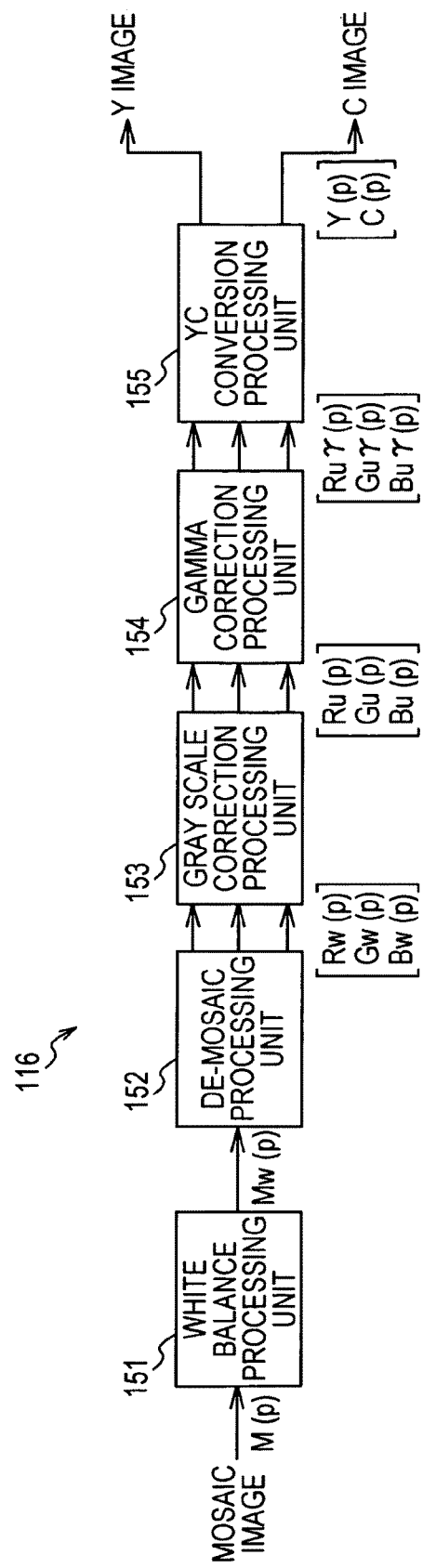
FIG. 5 is a block diagram illustrating an exemplary configuration of the functions realized when an internal processor of a DSP in FIG. 4 executes a predetermined program.

FIG. 5 is a block diagram illustrating an exemplary configuration of the functions realized when an internal processor (arithmetic unit) of the DSP 116 executes a predetermined program. By executing the predetermined program by the internal process of the DSP 116, the functions of the white balance processing unit 151, the de-mosaic processing unit 152, a gray scale correction processing unit 153, a gamma correction processing unit 154, and a YC conversion processing unit 155 are realized. In the example of FIG. 5, the gray scale correction processing unit 153 corresponds to the gray scale correction processing unit 41 in FIG. 3.

The white balance processing unit 151 acquires a mosaic image, which has been A/D-converted by the A/D converter 115, as image data such as a video. The mosaic image is an image in which data corresponding to a color component of one of R, G, and B is stored in one pixel and pixels are arrayed according to a color filter array called a Bayer filter array. The mosaic image is called RAW data.

The white balance processing unit 151 adjusts the white balance of the mosaic image so that the color balance of an achromatic portion of a subject actually becomes an achromatic color by multiplying a pixel value of each pixel of the acquired mosaic image by an appropriate coefficient. The white balance processing unit 151 supplies the mosaic image subjected to the white balance adjustment to the de-mosaic processing unit 152. Hereinafter, the mosaic image of which the white balance is adjusted is referred to as Mw.

The de-mosaic processing unit 152 performs a de-mosaic process on the mosaic image Mw supplied from the white balance processing unit 151 so that one pixel has all of R, G, and B components. Thus, three pieces of image data of an R image, a G image, and a B image corresponding to three color components R, G, and B, respectively are generated. The de-mosaic processing unit 152 supplies the three pieces of generated image data of the R image, the G image, and the B image to the gray scale correction processing unit 153.

Hereinafter, the three pieces of image data of the R image, the G image, and the B image are collectively referred to as RGB image. Hereinafter, a pixel value at a pixel position p of the mosaic image is referred to as M(p). Hereinafter, pixel values at the pixel position p of the image data subjected to the de-mosaic process are referred to as [Rw(p), Gw(p), Bw(p)]. Here, Rw(p) is a pixel value of a R component, Gw(p) is a pixel value of a G component, and Bw(p) is a pixel value of a B component.

The gray scale correction processing unit 153 performs gray scale correction processing on the RGB image and supplies the RGB image subjected to the gray scale correction processing to the gamma correction processing unit 154. At this time, the gray scale correction processing unit 153 makes intermediate data (representative value) from a signal input at a first step and performs the gray scale correction process by performing an interpolation process on the intermediate data at a second step. Hereinafter, the pixel values at the pixel position p of the image data subjected to the gray scale correction processing are referred to as [Ru(p), Gu(p), Bu(p)]. Here, Ru(p) is a pixel value of a R component, Gu(p) is a pixel value of a G component, and Bu(p) is a pixel value of a B component.

The gamma correction processing unit 154 performs gamma correction processing on the RGB image subjected to gray scale conversion. The gamma correction processing unit 154 supplies the RGB image subjected to the gamma correction processing to the YC conversion processing unit 155. Hereinafter, pixel values at the pixel position p of the image data subjected to the gamma correction processing are [Ruγ(p), Guγ(p), Buγ(p)]. Here, Ruγ(p) is a pixel value of a R component, Guγ(p) is a pixel value of a G component, and Buγ(p) is a pixel value of a B component.

The YC conversion processing unit 155 performs a YC matrix process and a chroma component band limiting on the RGB image subjected to the gamma correction processing to generate a Y image formed by a luminance component (Y component) and a C image formed by a color difference component (Cb or Cr component). The YC conversion processing unit 155 supplies the generated Y image and C image to the LCD driver 118 or the CODEC 120, as necessary. Hereinafter, pixel values at the pixel position p of the image data output from the YC conversion processing unit 155 are referred to as [Y(p), C(p)]. Here, Y(p) is the value of the luminance component in the Y image and C(p) is the value of the color difference component in the C image. Hereinafter, the Cb component of the C image is referred to as Cb(p) and the Cr component of the C image is referred to as Cr(p).

Exemplary Configuration of Gray scale Correction Processing Unit

Figure 6:
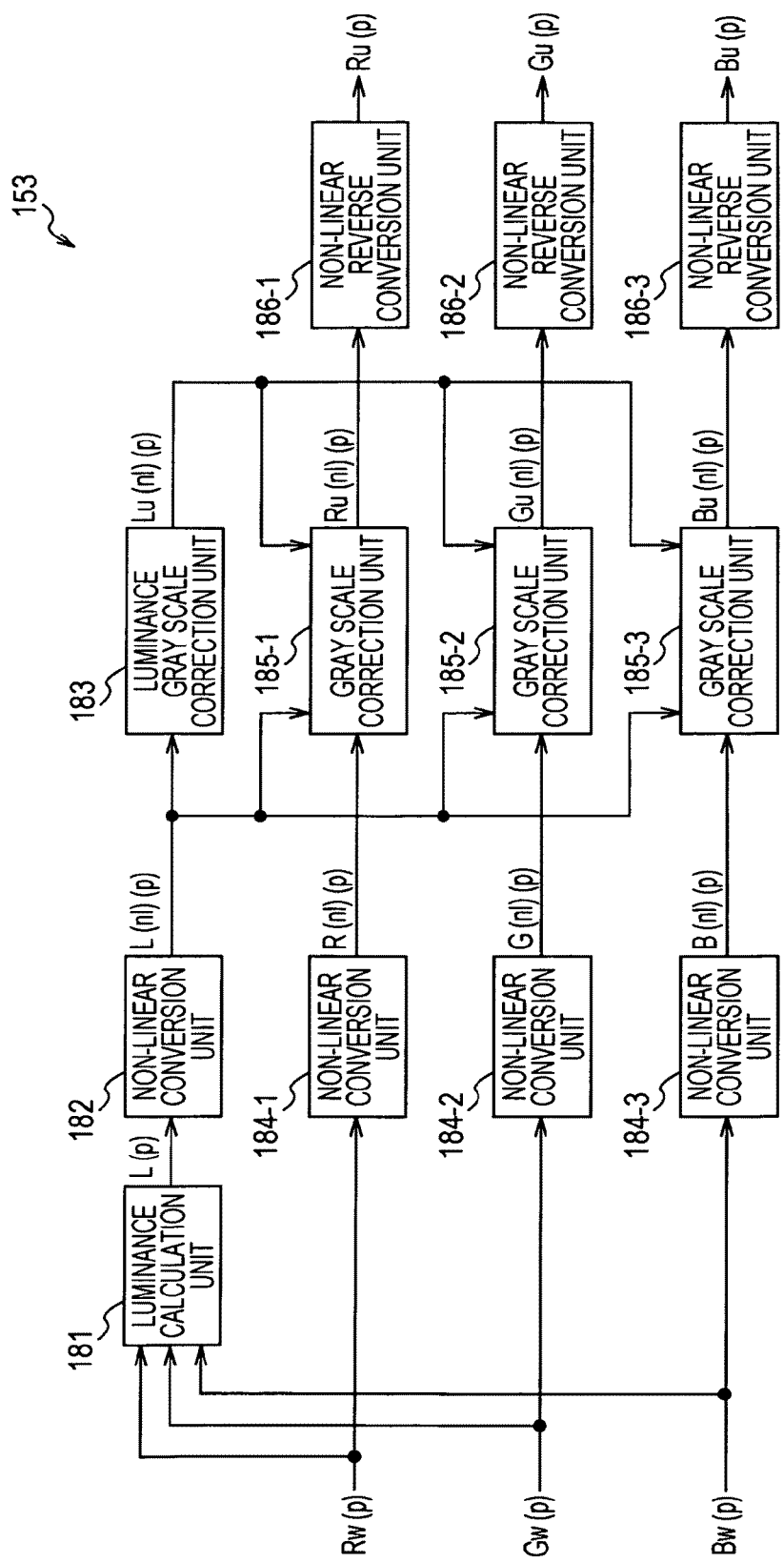
FIG. 6 is a block diagram illustrating an exemplary configuration of the functions of a gray scale correction processing unit in FIG. 5.

FIG. 6 is a block diagram illustrating an exemplary configuration of the functions of the gray scale correction processing unit 153. The gray scale correction processing unit 153 includes a luminance calculation unit 181, a non-linear conversion unit 182, a luminance gray scale correction unit 183, non-linear conversion units 184-1 to 184-3, gray scale correction units 185-1 to 185-3, and non-linear reverse conversion unit 186-1 to 186-3.

In the example of FIG. 6, the luminance calculation unit 181 corresponds to the luminance generation unit 21 in FIG.

3. The luminance gray scale correction unit 183 corresponds to the configuration of the luminance generation unit 21, the division unit 28, the multiplier 29, and the like of the gray scale correction processing unit 41 in FIG. 3. The gray scale correction units 185-1 to 185-3 correspond to the division unit 28 and the multiplier 29 in FIG. 3. In effect, since logarithmic conversion is used for the gray scale correction units 185-1 to 185-3, subtraction and addition are used instead of division and multiplication.

The luminance calculation unit 181 calculates the value (luminance value L(p)) of the luminance component corresponding to the pixel position from the pixel values Rw(p), Gw(p), and Bw(p) of the RGB images supplied from the de-mosaic processing unit 152, and then supplies the calculated value to the non-linear conversion unit 182. The non-linear conversion unit 182 performs non-linear conversion on the luminance value L(p) from the luminance calculation unit 181, and then supplies a luminance value L(nl)(p) obtained through the non-linear conversion to the luminance gray scale correction unit 183 and the gray scale correction units 185-1 to 185-3.

The luminance gray scale correction unit 183 performs gray scale correction on the luminance value L(nl)(p) by compressing the gray scales of the luminance value L(nl)(p) from the non-linear conversion unit 182, and then supplies the luminance value Lu(nl)(p) obtained through the gray scale correction to the gray scale correction units 185-1 to 185-3.

The non-linear conversion units 184-1 to 184-3 perform non-linear conversion on the pixel values Rw(p), Gw(p), and Bw(p) of the RGB image supplied from the de-mosaic processing unit 152, respectively. Moreover, the non-linear conversion units 184-1 to 184-3 supply pixel values R(nl)(p), G(nl)(p), and B(nl)(p) obtained through the non-linear conversion to the gray scale correction units 185-1 to 185-3, respectively. Hereinafter, when it is not necessary to distinguish the non-linear conversion units 184-1 to 184-3 from each other, the non-linear conversion units 184-1 to 184-3 are simply called the non-linear conversion units 184.

The gray scale correction units 185-1 to 185-3 perform gray scale correction on the pixel values R(nl)(p), G(nl)(p), and B(nl)(p) from the non-linear conversion units 184-1 to 184-3 so as to correspond to an input/output luminance value ratio using the luminance value L(nl)(p) from the non-linear conversion unit 182 and the luminance value Lu(nl)(p) from the luminance gray scale correction unit 183, respectively. The gray scale correction units 185-1 to 185-3 supply the pixel values Ru(nl)(p), Gu(nl)(p), and Bu(nl)(p) obtained through the gray scale correction to the non-linear reverse conversion units 186-1 to 186-3, respectively.

The non-linear reverse conversion units 186-1 to 186-3 perform non-linear reverse conversion, which is reverse to the non-linear conversion of the non-linear conversion units 184, on the pixel values Ru(nl)(p), Gu(nl)(p), and Bu(nl)(p) from the gray scale correction units 185-1 to 185-3. The non-linear reverse conversion units 186-1 to 186-3 each supply the pixel value Ru(p), Gu(p), and Bu(p) obtained through the non-linear reverse conversion to the gamma correction processing unit 154.

Hereinafter, when it is not necessary to distinguish the gray scale correction units 185-1 to 185-3 from each other, the gray scale correction units 185-1 to 185-3 are simply called the gray scale correction units 185. Hereinafter, when it is not necessary to distinguish the non-linear reverse conversion units 186-1 to 186-3 from each other, the non-linear reverse conversion units 186-1 to 186-3 are simply called the non-linear reverse conversion units 186.

Exemplary Configuration of Luminance Gray Scale Correction Unit

Figure 7:
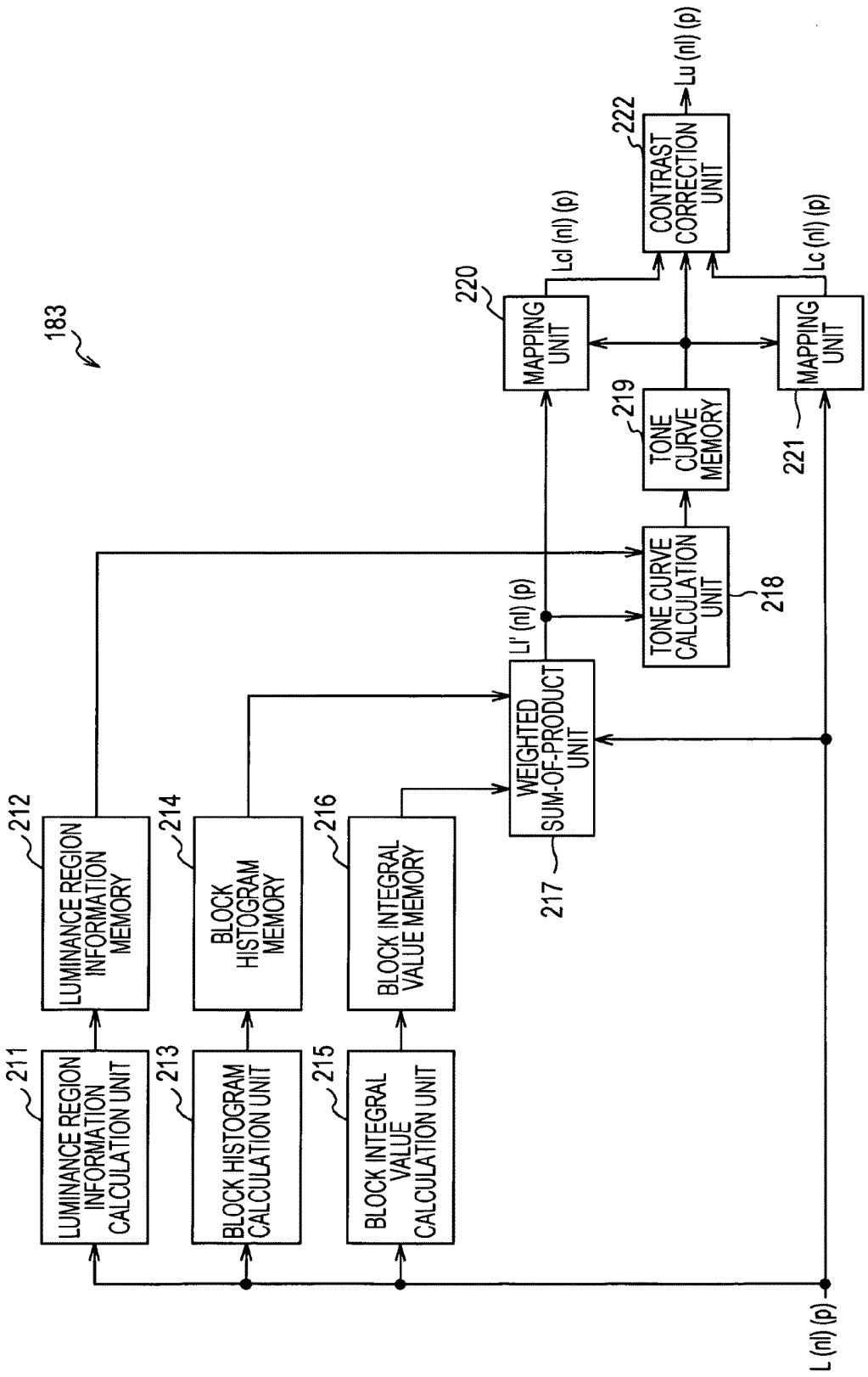
FIG. 7 is a block diagram illustrating an exemplary configuration of the functions of a luminance gray scale correction unit in FIG. 6.

FIG. 7 is a block diagram illustrating an exemplary configuration of the functions of the luminance gray scale correction unit 183 of FIG. 6. The luminance gray scale correction unit 183 includes a luminance region information calculation unit 211, a luminance region information memory 212, a block histogram calculation unit 213, a block histogram memory 214, a block integral value calculation unit 215, a block integral value memory 216, a weighted sum-of-product unit 217, a tone curve calculation unit 218, a tone curve memory 219, a mapping unit 220, a mapping unit 221, and a contrast correction unit 222.

In the example of FIG. 7, the luminance region information calculation unit 211 corresponds to the luminance region information calculation unit 22 in FIG. 3 and the luminance region information memory 212 corresponds to the luminance region information memory 23 in FIG. 3. Moreover, the block histogram calculation unit 213 and the block integral value calculation unit 215 correspond to the LPF 24 in FIG. 3 and the block histogram memory 214 and the block integral value memory 216 correspond to the intermediate memory 25 in FIG. 3. Furthermore, the weighted sum-of-product unit 217 corresponds to the expansion processing unit 26 and the adjustment processing unit 51 in FIG. 3 and the tone curve calculation unit 218 to the contrast correction unit 222 correspond to the gray scale compression processing unit 27 in FIG. 3.

The luminance region information calculation unit 211, the block histogram calculation unit 213, and the block integral value calculation unit 215 calculate wide-area information regarding the RGB image and update this wide-area information frame by frame.

That is, the luminance region information calculation unit 211 calculates foot values which are the luminance values of the feet of a dark luminance side and a bright luminance side in a histogram of the luminance values of the pixels of a one-frame image (hereinafter, referred to as a luminance image) formed with the luminance value L(nl)(p) supplied from the non-linear conversion unit 182, and then stores the foot values as the luminance region information in the luminance region information memory 212. The luminance region information memory 212 temporarily stores the luminance region information supplied from the luminance region information calculation unit 211 and supplies the luminance region information to the tone curve calculation unit 218.

The block histogram calculation unit 213 divides the one-frame luminance image formed with the luminance value L(nl)(p) supplied from the non-linear conversion unit 182 into a plurality of space blocks (regions) in a space direction and further divides the space block into luminance blocks in a luminance direction. Here, the luminance block has pixels with a luminance value within a luminance range predetermined for the luminance block among pixels inside the space block. Accordingly, for example, when the space block is divided into D luminance blocks, the range of the luminance value is divided into D ranges in advance. Therefore, the pixel inside the space block is classified as one of the D luminance blocks depending on whether the luminance value is within one of the D ranges.

The block histogram calculation unit 213 calculates the frequency value of the pixels of each luminance block obtained by dividing the luminance image and supplies such a frequency value as a block histogram to the block histogram memory 214. That is, the block histogram represents the number of pixels belonging to (classified as) each luminance block. The block histogram memory 214 temporarily stores the block histogram supplied from the block histogram calculation unit 213 and supplies the block histogram to the weighted sum-of-product unit 217.

The block integral value calculation unit 215 calculates the integral value (sum) of the luminance values of the pixels belonging to the luminance block for each luminance block from the one-frame luminance image formed with the luminance value L(nl)(p) supplied from the non-linear conversion unit 182, and then supplies the calculated integral value as a block integral value to the block integral value memory 216. The block integral value memory 216 temporarily stores the block integral value supplied from the block integral value calculation unit 215 and supplies the block integral value to the weighted sum-of-product unit 217.

The luminance region information, the block histogram, and the block integral value are the representative value of the one-frame luminance image and correspond to the above-described intermediate data. Hereinafter, the luminance region information, the block histogram, and the block integral value are appropriately referred to as the intermediate data. The luminance region information, the block histogram, and the block integral value serving as the intermediate data are maintained in the luminance region information memory 212, the block histogram 214, and the block integral value 216, respectively, for a time corresponding to one frame of the luminance image (RGB image) to be updated frame by frame.

The weighted sum-of-product unit 217 calculates a general luminance value Ll(nl)(p), which is a luminance value of an image (hereinafter, referred to as a general luminance image) formed from a very low frequency component of the luminance image formed with the luminance value L(nl)(p), from the luminance value L(nl)(p) from the non-linear conversion unit 182, the block histogram from the block histogram memory 214, and the block integral value from the block integral value memory 216.

That is, the general luminance value Ll(nl)(p) of the pixel with the luminance value L(nl)(p) from the non-linear conversion unit 182 is calculated using the block histogram and the block integral value calculated from the luminance image (RGB image) of a frame temporally immediately before a processing target frame. Here, the general luminance value refers to information corresponding to the average luminance of an object region to which the pixels on a sort of RGB image belong, that is, a luminance value representing average brightness of the object region to which the pixels belong to.

Hereinafter, a pixel to be processed, for example, a pixel of the luminance value L(nl)(p) supplied to the luminance gray scale correction unit 183 is referred to as a processing target pixel.

It takes a time corresponding to one frame to calculate the intermediate data used in the weighted sum-of-product unit 217. Therefore, the actually generated intermediate data is used when the image information of the subsequent frame is input. Accordingly, a variation (difference) in the viewing angle or the luminance between an image at the time of generating the intermediate data (first step) and an image at the time of using the intermediate data (second step) is sometimes large.

Based on a filter effect adjustment amount which is an output ratio corresponding to the variation (difference) in the viewing angle or the luminance between the image at the first step and the image at the second step, the weighted sum-of-product unit 217 blends the calculated general luminance value Ll(nl)(p) and the luminance value L(nl)(p) from the non-linear conversion unit 182. Then, the weighted sum-of-product unit 217 supplies the blended luminance value as a general luminance value Ll'(nl)(p) to the tone curve calculation unit 218 and the mapping unit 220.

The tone curve calculation unit 218 calculates the shape of a tone curve applied to compress the gray scales of the luminance value from the luminance region information from the luminance region information memory 212 and the luminance value Ll'(nl)(p) from the weighted sum-of-product unit 217, and then supplies the calculation result to the tone curve memory 219. The tone curve memory 219 stores a tone curve from the tone curve calculation unit 218 and supplies the stored tone curve to the mapping unit 220, the mapping unit 221, and the contrast correction unit 222.

The mapping unit 220 compresses (corrects) the gray scale of the luminance value Ll'(nl)(p) from the weighted sum-of-product unit 217 based on the tone curve stored in the tone curve memory 219, and then supplies a luminance value Lcl(nl)(p) obtained through the gray scale correction to the contrast correction unit 222. The mapping unit 221 compresses (corrects) the gray scale of the luminance value L(nl)(p) from the non-linear conversion unit 182 based on the tone curve stored in the tone curve memory 219, and then supplies a luminance value Lc(nl)(p) obtained through the gray scale correction to the contrast correction unit 222.

The contrast correction unit 222 corrects the contrast of the luminance image subjected to the gray scale compression and formed with the luminance value Lc(nl)(p) based on the luminance value Lcl(nl)(p) from the mapping unit 220, the luminance value Lc(nl)(p) from the mapping unit 221, and the tone curve stored in the tone curve memory 219. Then, the contrast correction unit 222 supplies the luminance value Lu(nl)(p) subjected to the contrast correction to the gray scale correction unit 185.

That is, the luminance gray scale correction unit 183 has a configuration in which the luminance gray scale correction is performed at two steps. In such a configuration, the first step is performed by the luminance region information calculation unit 211, the block histogram calculation unit 213, and the block integral value calculation unit 215, and then the intermediate data as the calculation result are stored in the luminance region information memory 212, the block histogram memory 214, and the block integral value memory 216.

At the second step, the intermediate data is read from the block histogram memory 214 and the block integral value memory 216, and the weighted sum-of-product unit 217 interpolates the intermediate data. Then, by the mapping unit 220, the mapping unit 221, and the contrast correction unit 222 adjust the gray scales using the interpolated output values. At this time, the tone curve calculation unit 218 calculates the tone curve used in the mapping units 220 and 221 and the contrast correction unit 222 using the value of the luminance region information memory 212, and then the tone curve is stored in the tone curve memory 219.

In the configuration of FIG. 7, the weighted sum-of-product unit 217 blends the image obtained by interpolating the intermediate data and the image at the second step according to the variation (difference) between the image at the first step and the image at the second step, and then the blended image is output to the tone curve calculation unit 218 and the mapping unit 220. Thus, in the process subsequent to the process of the tone curve calculation unit 218, calculation precision is prevented from deteriorating.

Exemplary Configuration of Weighted Sum-of-Product Unit

Figure 8:
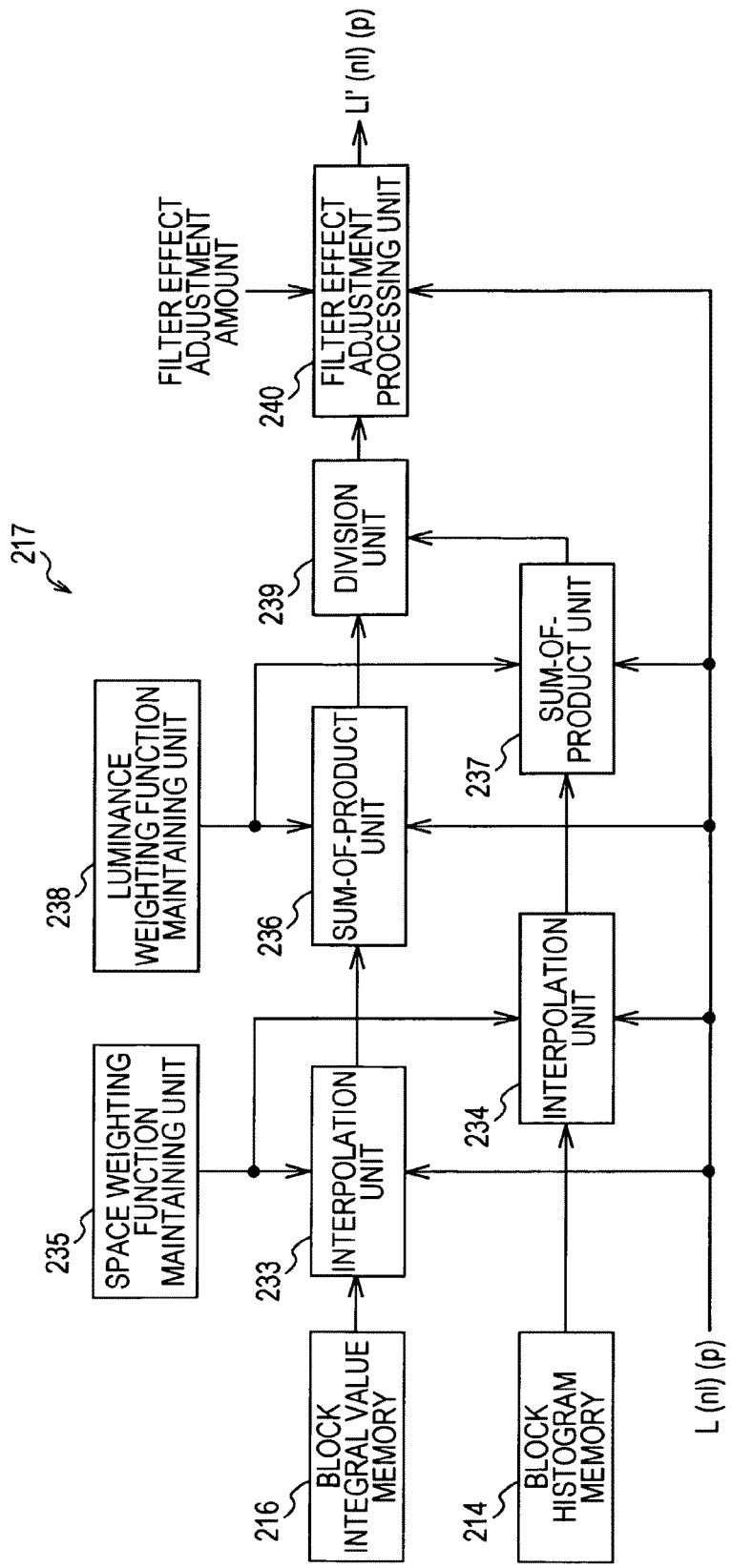
FIG. 8 is a block diagram illustrating an exemplary configuration of the functions of a weighted sum-of-product unit in FIG. 7.

FIG. 8 is a block diagram illustrating an exemplary configuration of the functions of the weighted sum-of-product unit 217 in FIG. 7. The weighted sum-of-product unit 217 includes an interpolation unit 233, an interpolation unit 234, a space weighting function maintaining unit 235, a sum-ofproduct unit 236, a sum-of-product unit 237, a luminance weighting function maintaining unit 238, a division unit 239, and a filter effect adjustment processing unit 240.

Values (representative values) obtained by roughly sampling the feature amounts of an image three-dimensionally (space dimension and level dimension) are stored as the processing result of the first step in the block histogram memory 214 and the block integral value memory 216. The weighted sum-of-product unit 217 aims to obtain a dense signal with the same pixel number as that of the input image by performing interpolation expansion on the rough representative values stored in the block histogram memory 214 and the block integral value memory 216 by an interpolation filter as the process of the second step. Here, a bilateral filter shown in Expression (1) is used as the interpolation filter.

The position of the pixel of the luminance value $L(nl)(p)$ from the non-linear conversion unit 182, that is, the position of the processing target pixel is supplied to the interpolation units 233 and 234. The interpolation units 233 and 234 perform space dimension interpolation expansion processing using a space weighting function lookup table maintained as a parameter in the space weighting function maintaining unit 235 and position information regarding the input image from the non-linear conversion unit 182.

Specifically, the interpolation unit 233 calculates the pixel with the luminance value $L(nl)(p)$, which is supplied from the non-linear conversion unit 182, on the luminance image, that is, the block integral value obtained by interpolating each middle value of the luminance range of the luminance block at the position of the processing target pixel, sets the block integral value as a luminance integral value, and supplies the luminance integral value to the sum-of-product unit 236. That is, on the assumption that $\lambda$ is the middle value of the range of the luminance values of the pixels inside the luminance block, the interpolation unit 233 calculates the luminance integral value for the middle value $\lambda$ by multiplying each of the block integral values of sixteen luminance blocks with the middle value $\lambda$ among the luminance blocks divided from 4 by 4 space blocks near the processing target pixel in the space direction by an interpolation coefficient and calculating the sum of the block integral values multiplied by the interpolation coefficient.

In other words, the interpolation unit 233 calculates the luminance integral value for each middle value $\lambda$ by performing the interpolation processing using the block integral values of the luminance blocks near the processing target pixel. Thus, D luminance integral values are calculated for the respective middle values $\lambda$. Moreover, the interpolation coefficient by which each block integral value is multiplied is read from the space weighting function lookup table maintained in the space weighting function maintaining unit 235 based on a relative position relationship between the position of the processing target pixel and the space blocks near the processing target pixel.

Likewise, the interpolation unit 234 calculates the pixel with the luminance value $L(nl)(p)$, which is supplied from the non-linear conversion unit 182, on the luminance image, that is, the block histogram obtained by interpolating each middle value of the luminance range of the luminance block at the position of the processing target pixel, sets the block histogram as a luminance histogram, and supplies the luminance histogram to the sum-of-product unit 237. That is, the interpolation unit 234 calculates the luminance histogram for the middle value $\lambda$ by multiplying each of the block histograms of sixteen luminance blocks with the middle value $\lambda$ among the luminance blocks of 4 by 4 space blocks near the processing target pixel in the space direction by an interpolation coefficient and calculating the sum of the block histograms multiplied by the interpolation coefficient.

In other words, the interpolation unit 234 calculates the luminance histogram for each middle value $\lambda$ by performing the interpolation processing using the block histograms of the luminance blocks near the processing target pixel. Thus, D luminance histograms are calculated for the respective middle values $\lambda$. Moreover, the interpolation coefficient by which each block histogram is multiplied is read from the space weighting function lookup table maintained in the space weighting function maintaining unit 235 based on a relative position relationship between the position of the processing target pixel and the space blocks near the processing target pixel.

The sum-of-products 236 and 237 perform the level dimensional interpolation expansion processing using the luminance weighting function lookup table maintained as the parameter in the luminance weighting function maintaining unit 238 and the luminance value $L(nl)(p)$ from the non-linear conversion unit 182.

Specifically, the sum-of-product unit 236 performs sum-of-product calculation on the D luminance integral values supplied from the interpolation unit 233 using a luminance weighted value, and then supplies the luminance integral values subjected to the sum-of-product calculation to the division unit 239. That is, the sum of the luminance integral values multiplied by the luminance weighted value is calculated. Here, the luminance weighted value by which the luminance integral values are multiplied is calculated from a luminance weighting function of the luminance weighting function lookup table maintained in the luminance weighting function maintaining unit 238 based on the luminance value $L(nl)(p)$ and the middle values $\lambda$ supplied from the non-linear conversion unit 182 to the sum-of-product unit 236.

Likewise, the sum-of-product unit 237 performs sum-of-product calculation on the D luminance histograms supplied from the interpolation unit 234 using a luminance weighted value, and then supplies the luminance histograms subjected to the sum-of-product calculation to the division unit 239. That is, the sum of the luminance histograms multiplied by the luminance weighted value is calculated. Here, the luminance weighted value by which the luminance histograms are multiplied is calculated from the luminance weighting function of the luminance weighting function lookup table maintained in the luminance weighting function maintaining unit 238 based on the luminance value $L(nl)(p)$ and the middle values $\lambda$ supplied from the non-linear conversion unit 182 to the sum-of-product unit 237.

The division unit 239 calculates the general luminance value $Ll(nl)(p)$ of the processing target pixel by dividing the luminance integral value from the sum-of-product unit 236 by the luminance histogram from the sum-of-product unit 237, and supplies the general luminance value $Ll(nl)(p)$ to the filter effect adjustment processing unit 240.

Here, processing breakdown caused due to error expansion of the bilateral filter occurs due to the fact that the output from the division unit 239 is not the intended value. That is, the division unit 239 performs calculation by Expression (1) described above. Therefore, for example, when the interpolated value of the block histogram which is the denominator on the right-hand side in Expression (1) is 0, the value calculated by the division unit 239 is indefinite. Moreover, when the luminance of an image is extremely varied due to emitting of the flash or the like, the output value of the bilateral filter may not follow the luminance variation and thus the unintended general luminance value (for example, the luminance value of the previous frame) is output from the division unit 239.

In order to prevent this problem, the filter effect adjustment processing unit 240 blends the general luminance value Ll(nl)(p), which is the output value of the bilateral filter, from the division unit 239 and the luminance value L(nl)(p) supplied from the non-linear conversion unit 182 to the filter effect adjustment processing unit 240 according to a filter effect adjustment amount.

For example, when the variation amount of the frame temporally one frame before the frame to be processed is large, the general luminance value Ll(nl)(p) and the luminance value L(nl)(p) are blended with each other so that the output ratio of the general luminance value Ll(nl)(p) from the division unit 239 is smaller than the output ratio of the luminance value L(nl)(p). On the contrary, when the variation amount of the frame temporally one frame before the frame to be processed is small, the general luminance value Ll(nl)(p) and the luminance value L(nl)(p) are blended with each other so that the output ratio of the general luminance value Ll(nl)(p) from the division unit 239 is larger than the output ratio of the luminance value L(nl)(p).

The filter effect adjustment processing unit 240 supplies the blended luminance value as the general luminance value Ll'(nl)(p) to the tone curve calculation unit 218 and the mapping unit 220.

The filter effect adjustment amount is determined and supplied by, for example, the CPU 122 in FIG. 5.

Figure 9:
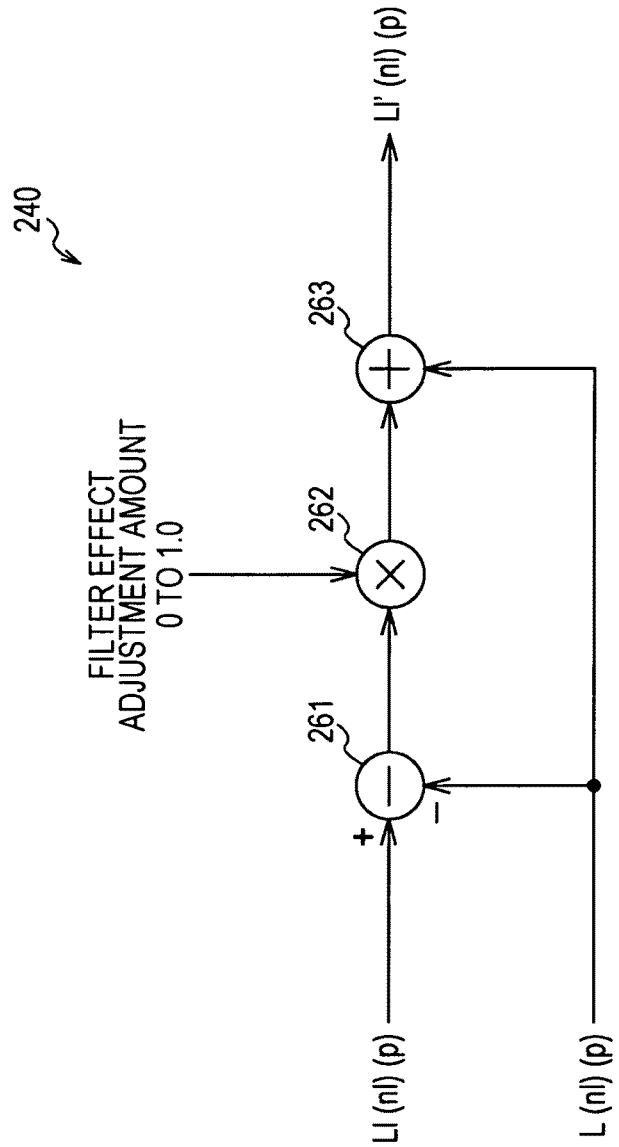
FIG. 9 is a block diagram illustrating an exemplary configuration of the functions of a filter effect adjustment processing unit in FIG. 8.

FIG. 9 is a block diagram illustrating an exemplary configuration of the functions of the filter effect adjustment processing unit 240 in FIG. 8.

The filter effect adjustment processing unit 240 in FIG. 9 includes a subtraction unit 261, a multiplication unit 262, and an addition unit 263.

The general luminance value Ll(nl)(p), which is the output value of the bilateral filter, from the division unit 239 is input to the subtraction unit 261. The luminance value L(nl)(p) from the non-linear conversion unit 182 is input to the subtraction unit 261 and the addition unit 263.

The subtraction unit 261 outputs a difference luminance value obtained through subtraction between the luminance value Ll(nl)(p) from the division unit 239 and the luminance value L(nl)(p) from the non-linear conversion unit 182 to the multiplication unit 262. For example, the multiplication unit 262 multiplies the luminance value obtained through the subtraction and supplied from the subtraction unit 261 by the filter effect adjustment amount (for example, 0 to 1.0) supplied from, for example, the CPU 122 in FIG. 5 and outputs the difference luminance value obtained through multiplication to the addition unit 263.

The addition unit 263 adds the luminance value L(nl)(p) from the non-linear conversion unit 182 to the luminance value from the multiplication unit 262 and outputs the luminance value obtained through the addition as the general luminance value Ll'(nl)(p) to the tone curve calculation unit 218 and the mapping unit 220 at the rear stage.

In the example of FIG. 9, when the supplied filter effect adjustment amount is 0, the luminance value L(nl)(p) from the non-linear conversion unit 182 is output as the general luminance value Ll'(nl)(p) to the tone curve calculation unit 218 and the mapping unit 220 at the rear stage. On the other hand, when the supplied filter effect adjustment amount is 1, the luminance value Ll(nl)(p) from the division unit 239 is output as the general luminance value Ll'(nl)(p) to the tone curve calculation unit 218 and the mapping unit 220 at the rear stage.

Example of Image Processing

Next, the image processing of the digital camera 101 in FIG. 4 will be described with reference to the flowchart of FIG. 10. The image processing starts, for example, when the photographing of the digital video camera 101 starts and a stream of image data (mosaic image) starts to be supplied from the A/D converter 115 to the DSP 116. The image data supplied to the DSP 116 is sequentially stored in an internal memory (not shown) of the DSP 116.

In step S111, the white balance processing unit 151 reads a mosaic image. Specifically, the white balance processing unit 151 reads the mosaic image of a head frame stored in the internal memory (not shown) of the DSP 116.

In step S112, the white balance processing unit 151 adjusts the white balance of the acquired mosaic image and supplies the mosaic image to the de-mosaic processing unit 152.

In step S113, the de-mosaic processing unit 152 performs de-mosaic processing. That is, the de-mosaic processing unit 152 generates an RGB image by performing the de-mosaic processing on the mosaic image from the white balance processing unit 151 and supplies the RGB image to the gray scale correction processing unit 153.

In step S114, the gray scale correction processing unit 153 performs the gray scale correction processing to correct the gray scales of the RGB image from the de-mosaic processing unit 152. At this time, the gray scale correction processing unit 153 performs the gray scale correction processing on the luminance value of an image of a processing target frame obtained by blending the luminance value obtained through the interpolation process on the intermediate data generated from the image one frame before and the processing target luminance value at the ratio corresponding to the variation amount of the image of the frame temporally immediately before the processing target frame. Then, the gray scale correction processing unit 153 supplies the RGB image subjected to the gray scale correction processing to the gamma correction processing unit 154. The gray scale correction processing will be described below in detail with reference to FIGS. 11 and 12.

In step S115, the gamma correction processing unit 154 performs gamma correction on the RGB image from the gray scale correction processing unit 153 and supplies the RGB image subjected to the gamma correction to the YC conversion processing unit 155.

In step S116, the YC conversion processing unit 155 performs YC conversion processing. For example, the YC conversion processing unit 155 generates a Y image and a C image from the RGB image by performing YC matrix processing and chroma component band limiting on the RGB image from the gamma correction processing unit 154. In step S117, the YC conversion processing unit 155 outputs the Y image and the C image. For example, the YC conversion processing unit 155 outputs the Y image and the C image to the LCD driver 118 or the CODEC 120, as necessary.

In step S118, the white balance processing unit 151 determines whether there is a subsequent frame. For example, the white balance processing unit 151 determines that there is a subsequent frame, when the mosaic image of the subsequent frame is stored in the internal memory (not shown) of the DSP 116.

When the white balance processing unit 151 determines that there is a subsequent frame in step S118, the process proceeds to step S119. In step S119, the CPU 122 determines the filter effect adjustment amount and supplies the determined filter effect adjustment amount to the filter effect adjustment processing unit 240 in FIG. 8.

That is, the CPU 122 acquires a control value of the flash 125 in FIG. 5, the detection information from the gyro sensor 124, or the frame from the DSP 116 and performs motion searching or the like to determine the filter effect adjustment amount (0 to 1.0).

For example, when the filter effect adjustment amount is set to 0, the input luminance value is output without change, and thus the breakdown caused due to an error of the bilateral filter (the intermediate image and the image at the second step) can be prevented. On the contrary, when the filter effect adjustment amount is set to 1.0, the output of the bilateral filter is output without change and the processing is performed using the bilateral filter.

Therefore, the CPU 122 determines that there is abrupt change in the frame immediately before the frame being currently processed and the frame temporally one frame before the above frame and determines a small filter effect adjustment amount, when detecting the following variation.

For example, when the emitting of the flash 125 in FIG. 5 is controlled, it is determined that there is an abrupt variation in luminance value between the frames and the small filter effect adjustment is determined. Alternatively, when it is determined that a large degree of camera shaking occurs by performing integral calculation of the detection information from the gyro sensor 124, it is determined that there is abrupt change in the viewing angle between the frames and thus the small filter effect adjustment amount is determined.

For example, when the image data of the two frames are acquired from the DSP 116, motion is searched for within the acquired frames, and it is detected that an object or the like rapidly moving in the immediately prior frame crosses, it is determined that there is abrupt change in the luminance between the frames and thus the small filter effect adjustment amount is determined. A dedicated CPU may be used for the searching the motion. Moreover, the variation in the luminance value may be detected by detecting the emitting of the flash 125.

As described above, by determining the filter effect adjustment amount according to the magnitude of the variation between the frames, an image can be prevented from being broken down, for example, when an image is changed abruptly.

After step S119, the process returns to step S111 and the mosaic image of the subsequent processing target frame is read. When it is determined that there is no subsequent frame in step S118, the image processing ends.

Example of Gray Scale Correction Processing

Next, the gray scale correction processing corresponding to the process of step S114 in FIG. 10 will be described with reference to the flowcharts of FIGS. 11 and 12.

In step S141, the weighted sum-of-product unit 217 and the tone curve calculation unit 218 read the intermediate data. That is, the interpolation unit 233 of the weighted sum-of-product unit 217 reads the block integral value as the intermediate data from the block integral value memory 216 and the interpolation unit 234 of the weighted sum-of-product unit 217 reads the block histogram as the intermediate data from the block histogram memory 214. The tone curve calculation unit 218 reads the luminance region information as the intermediate data from the luminance region information memory 212.

In step S142, the luminance region information calculation unit 211 reads noise level (nl) and saturation level (nl) from the internal memory (not shown) of the DSP 116.

In step S143, the gray scale correction processing unit 153 reads the pixel value of the processing target pixel of the RGB image from the de-mosaic processing unit 152. That is, the non-linear conversion units 184-1 to 184-3 read the pixel value Rw(p) of the R component, the pixel value Gw(p) of the G component, and the pixel value Bw(p) of the B component of the processing target pixel, and the luminance calculation unit 181 reads the pixel values of the R, G, and B components of the processing target pixel.

In step S144, the luminance calculation unit 181 calculates the luminance value L(p) of the processing target pixel based on the read pixel values and supplies the luminance value L(p) to the non-linear conversion unit 182. For example, the luminance calculation unit 181 multiplies the pixel values of the read R, G, and B components by a predetermined coefficient, calculates a linear sum, and sets the result as the luminance value or sets the maximum value among the pixel values of the R, G, and B components as the luminance value.

In step S145, the non-linear conversion unit 182 performs the non-linear conversion on the luminance value L(p) from the luminance calculation unit 181 and supplies the luminance value L(nl)(p) obtained through the non-linear conversion to the luminance gray scale correction unit 183 and the gray scale correction unit 185. For example, the non-linear conversion unit 182 performs the non-linear conversion on the luminance value L(p) using a function having a convex upward monotonic increasing characteristic such as a power characteristic of an exponent smaller than 1 or a logarithmic characteristic.

In step S146, the luminance gray scale correction unit 183 and the gray scale correction unit 185 read the luminance value L(nl)(p) of the processing target pixel from the non-linear conversion unit 182.

In step S147, the luminance region information calculation unit 211 of the luminance gray scale correction unit 183 performs pixel processing of calculating the luminance region information. In the pixel processing of calculating the luminance region information, the luminance values of the pixels of the luminance image supplied up to the present are compared to the luminance values L(nl)(p) read from the non-linear conversion unit 182, and then sorting is performed.

In step S148, the block histogram calculation unit 213 performs pixel processing of calculating the block histogram. In the pixel processing of calculating the block histogram, the processing target pixels are classified as the luminance block based on the luminance values L(nl)(p) read from the non-linear conversion unit 182 and the positions of the processing target pixels. Then, the value of a counter (not shown) of the block histogram calculation unit 213 corresponding to the luminance block increases.

In step S149, the block integral value calculation unit 215 performs pixel processing of calculating the block integral value. In the pixel processing of calculating the block integral value, the processing target pixels are classified as the luminance block based on the luminance values L(nl)(p) read from the non-linear conversion unit 182 and the positions of the processing target pixels. Then, the luminance values L(nl)(p) are added to the block integral value corresponding to the luminance block.

In step S150, the weighted sum-of-product unit 217 calculates the general luminance value Ll(nl)(p) of the processing target pixels by calculating the general luminance value using the luminance values L(nl)(p) from the non-linear conversion unit 182. Then, the weighted sum-of-product unit 217 blends the calculated general luminance value Ll(nl)(p) with the luminance value L(nl)(p) from the non-linear conversion unit 182 according to the filter effect adjustment amount and supplies the blended luminance value as the general luminance value Ll'(nl)(p) to the tone curve calculation unit 218 and the mapping unit 220. The calculation of the general luminance value will be described below in detail with reference to FIG. 14.

In step S151, the tone curve calculation unit 218 calculates the tone curve from the luminance region information read from the luminance region information memory 212 and the general luminance value Ll'(nl)(p) from the weighted sum-of-product unit 217.

Figure 13:
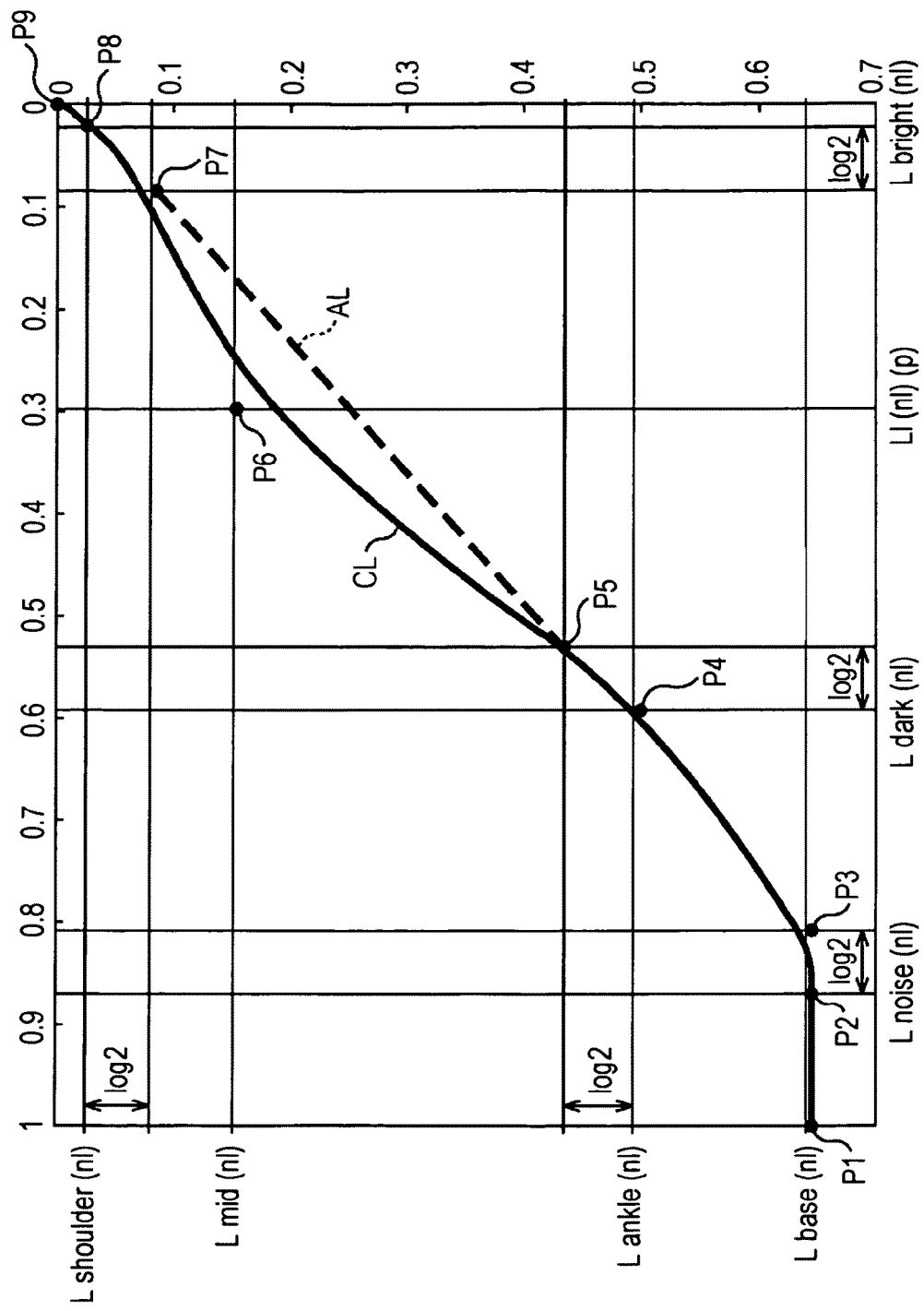
FIG. 13 is a diagram illustrating a tone curve.

For example, the tone curve calculation unit 218 sets control points of the tone curve shown in FIG. 13. In addition, the horizontal direction of the graph in FIG. 13 represents a logarithmic value of the input luminance before the gray scale correction and the vertical direction represents a logarithmic value of the output luminance after the gray scale correction by a tone curve CL.

First, the tone curve calculation unit 218 sets nine control points from a control point P1 to a control point P9. The control point P1 is set as a point at which the input luminance is the predetermined minimum level and the output luminance is the predetermined minimum level Lbase(nl). The control point P2 is set as a point at which the input luminance is a predetermined noise level Lnoise(nl) which is a luminance considered as a noise level and the output luminance is the minimum level Lbase(nl). The control point P3 is set as a point at which the input luminance is a luminance value which is double the noise level Lnoise(nl) and the output luminance is the minimum level Lbase(nl).

The control point P4 is set as a point at which the input luminance is a foot value Ldark(nl) of a dark luminance side as the luminance region information from the luminance region information memory 212 and the output luminance is a luminance Lankle(nl) which is the luminance value of nearly a black level. The control point P5 is set as a point at which the input luminance is a luminance value which is double the foot value Ldark(nl) and the output luminance is a luminance value which is double the luminance value Lankle(nl). The control point P6 is set as a point at which the input luminance is the general luminance value Ll'(nl)(p) from the weighted sum-of-product unit 217 and the output luminance is a middle luminance level Lmid(nl) which is nearly the predetermined middle of the luminance range of the output luminance. That is, when the general luminance value is subjected to the gray scale correction by the tone curve, the control point P6 is set so that the general luminance value is converted into nearly a middle value of the range of the luminance values subjected to the gray scale correction by the tone curve.

The control point P7 is set as a point at which the input luminance is a luminance value which is half of the foot value Lbright(nl) of a bright luminance side and the output luminance is a luminance value which is half of the luminance value Lshoulder(nl) which is a luminance value of nearly a white level. The control point P8 is set as a point at which the input luminance is a foot value Lbright(nl) as the luminance region information from the luminance region information memory 212 and the output luminance is the luminance value Lshoulder(nl). The control point P9 is set as a point at which the input luminance is the predetermined maximum value of the input luminance and the output luminance is the predetermined maximum value of the output luminance.

In FIG. 13, the slope of a line segment AL binding the control point P5 and the control point P7 represents a γ-comp parameter representing the slope of the tone curve CL.

For example, the shape of the tone curve CL of each processing target pixel is determined by calculating the output luminance value (tone curve value) for each input luminance value by B-Spline interpolation based on the control point P1 to the control point P9.

The shape of the tone curve CL may be maintained in a given format in the tone curve memory 219. However, since the shape of the tone curve CL is updated for each pixel, the shape of the tone curve CL is preferably maintained in a format in which the amount of data is small. For example, it is proper that the shape of the tone curve is expressed using several points to about ten points and the mapping units 220 and 221 calculate the tone curve CL based on the control points.

The tone curve calculation unit 218 stores the sets of the input luminances and the output luminances from the set control point P1 to the set control point P9 in the tone curve memory 219. In effect, during a period in which a one-frame luminance image is processed, only the input luminance of the control point P6 is updated whenever the processing target pixel is varied.

By setting the control point P3 as an auxiliary point, the tone curve CL can reliably be made to pass through the control point P2 or near the control point P2. That is, when the input luminance is nearly the noise level Lnoise(nl), the input luminance is subjected to the gray scale conversion so as to have a value which is almost the same as the minimum level Lbase(nl) of the output luminance. Moreover, by setting the control point P5 as an auxiliary point, the slope of the tone curve CL near (near the control point P4) a point at which the input luminance is nearly the foot value Ldark(nl) and the output luminance is the luminance value Lankle(nl) which is nearly a black level can be prevented from becoming extremely sharp or gentle. Furthermore, by setting the control point P7 as an auxiliary point, the slope of the tone curve Cl near a point (near the control point P8) at which the input luminance is nearly a margin value Lbright(nl) and the output luminance is the luminance value Lshoulder(nl) which is nearly the white level can be prevented from becoming extremely sharp or gentle.

Accordingly, the tone curve CL has a gentle slope near the control point P6 and thus becomes a reverse S-shaped monotonously increasing curve with a slope which is very close to 1 near the control points P4 and P8. That is, as for the tone curve CL, the brightness of a pixel with a high luminance value is suppressed when the general luminance value Ll'(nl)(p) is high, whereas a pixel with a low luminance value is bright when the general luminance value Ll'(nl)(p) is low. Thus, by combining the gray scale compression and the contrast correction using the tone curve CL, it possible to compress the gray scales of an image so that a dark portion on the image becomes bright without causing white blurring while maintaining the details of the image nearly as they are.

Figure 11:
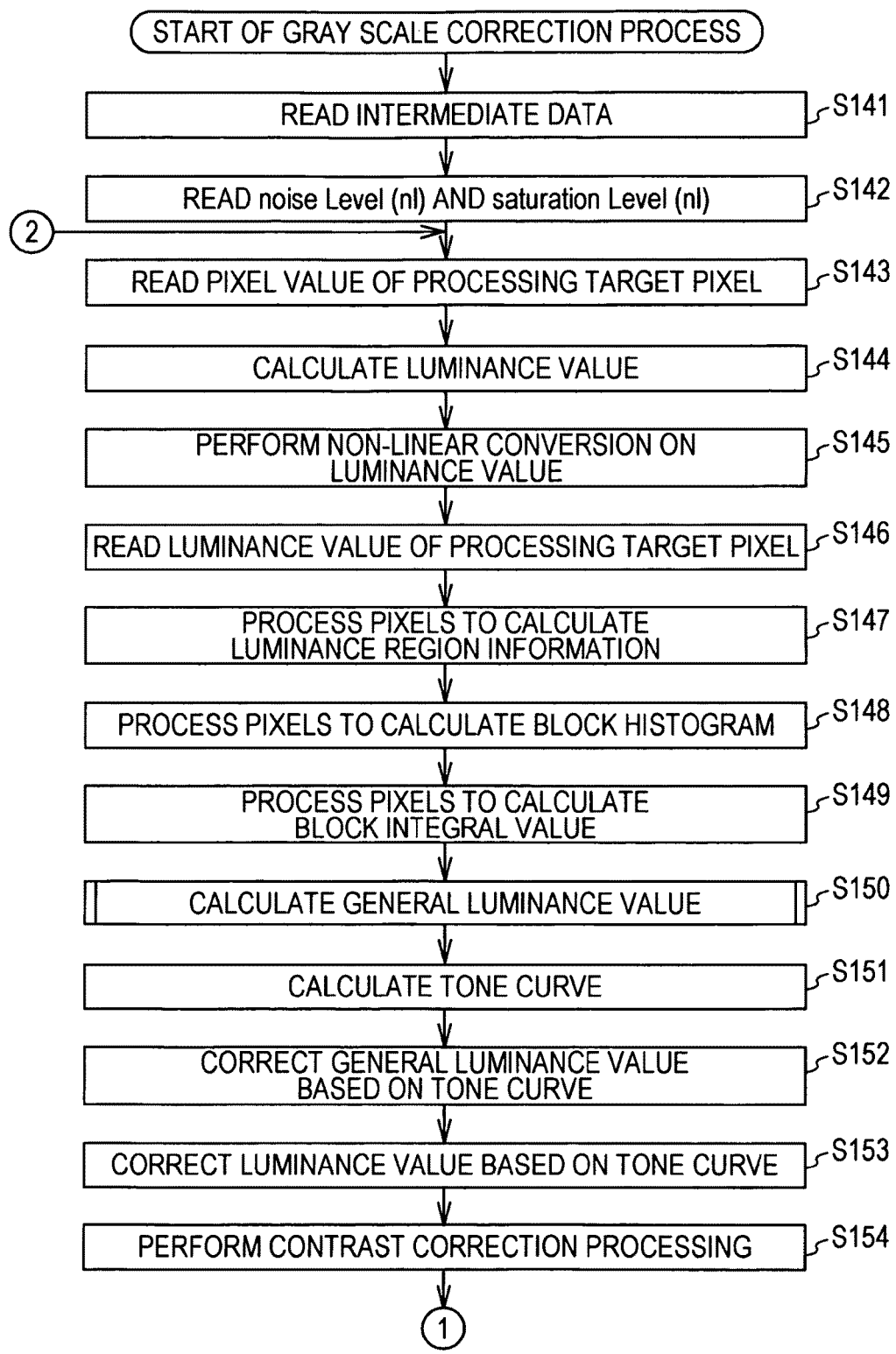
FIG. 11 is a flowchart illustrating gray scale correction processing of step S114 in FIG. 10.
Figure 12:
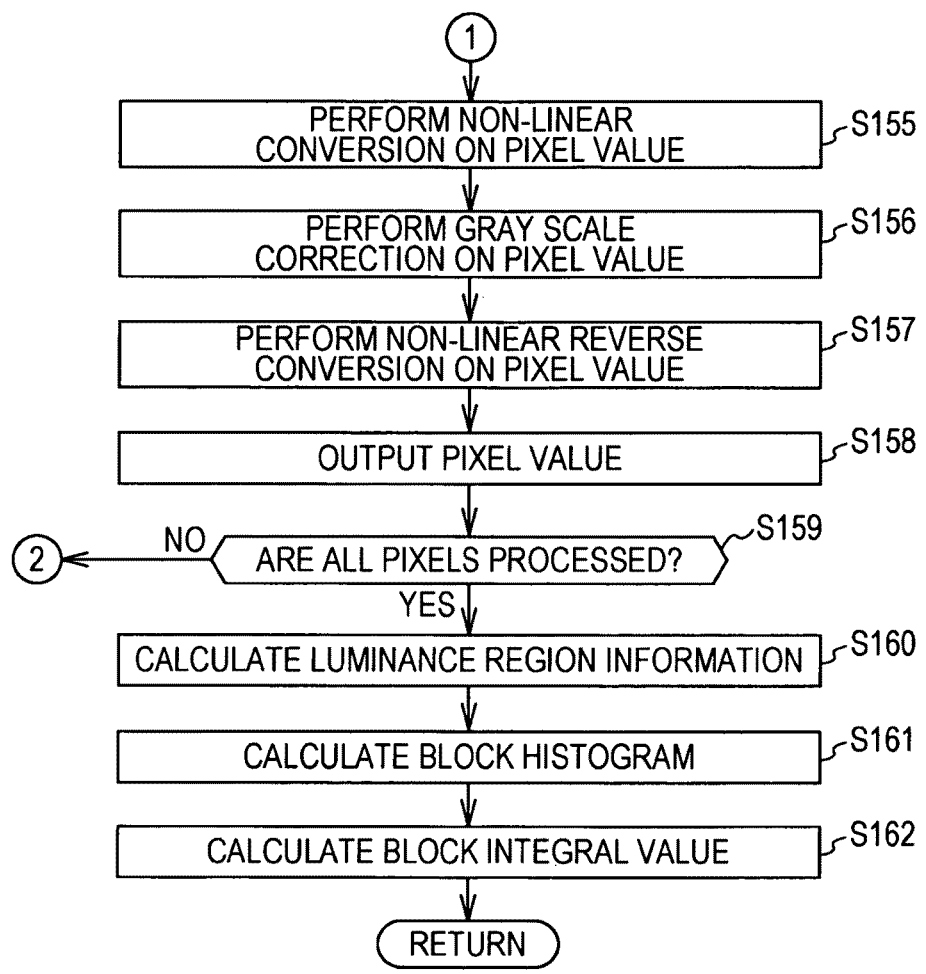
FIG. 12 is a flowchart illustrating the gray scale correction processing of step S114 in FIG. 10.

Referring back to the flowchart of FIG. 11, the shape of the tone curve is calculated in step S151. Then, when the shape of the tone curve, and more particularly, the sets of the input luminances and the output luminances of the control points are stored in the tone curve memory 219, the process proceeds to step S152.

In step S152, the mapping unit 220 corrects the general luminance value Ll'(nl)(p) supplied from the weighted sum-of-product unit 217 based on the tone curve stored in the tone curve memory 219, and then supplies the general luminance value Ll'(nl)(p) to the contrast correction unit 222. That is, the mapping unit 220 corrects the gray scales of the general luminance value Ll'(nl)(p) by calculating the tone curve using the control points stored in the tone curve memory 219 by B-Spline interpolation and converting the general luminance value Ll'(nl)(p) into a general luminance value Lcl(nl)(p) based on the calculated tone curve.

In step S153, the mapping unit 221 corrects the luminance value L(nl)(p) of the read processing target pixel based on the tone curve stored in the tone curve memory 219, and then supplies the corrected luminance value L(nl)(p) to the contrast correction unit 222. That is, the mapping unit 221 corrects the gray scales of the luminance value L(nl)(p) by calculating the tone curve using the control points stored in the tone curve memory 219 by B-Spline interpolation and converting the luminance value Lc(nl)(p) from the non-linear conversion unit 182 into the luminance value Lc(nl)(p) based on the calculated tone curve.

In step S154, the contrast correction unit 222 performs contrast correction processing to correct the gray scales based on the tone curve and compensates the luminance image deteriorating in contrast and formed with the luminance value Lc(nl)(p) so as to have nearly the same contrast as that of the original image. The contrast correction unit 222 supplies the contrast-corrected luminance value Lu(nl)(p) to the gray scale correction unit 185.

In step S155, the non-linear conversion unit 184 performs the non-linear conversion on the pixel value of the read processing target pixel and supplies the result to the gray scale correction unit 185. That is, the non-linear conversion units 184-1 to 184-3 perform the same non-linear conversion as the non-linear conversion of step S145 on the pixel values Rw(p), Gw(p), and Bw(p) of the RGB image, respectively.

In step S156, the gray scale correction units 185-1 to 185-3 perform the gray scale correction on the pixel value from the non-linear conversion unit 184 using the luminance value L(nl)(p) from the non-linear conversion unit 182 and the luminance value Lu(nl)(p) from the luminance gray scale correction unit 183. The gray scale correction units 185 supply the pixel value subjected to the gray scale correction to the non-linear reverse conversion unit 186.

For example, the gray scale correction units 185 multiply the pixel values of the respective color components by a ratio between the luminance value L(nl)(p) and the luminance value Lu(nl)(p) subjected to the gray scale correction. More specifically, for example, the gray scale correction unit 185-1 calculates the pixel value Ru(nl)(p) subjected to the gray scale correction by performing calculation by Expression (2) below.

[Expression 2]

$$Ru(nl)(p) = \left(\frac{R(nl)(p)}{L(nl)(p)}\right) \cdot Lu(nl)(p) \qquad (2)$$

In Expression (2), a pixel value R(nl)(p) subjected to the non-linear conversion is multiplied by a ratio between the luminance values before and after the gray scale correction, that is, a value obtained by dividing the luminance value Lu(nl)(p) subjected to the gray scale correction by the luminance value L(nl)(p) before the gray scale correction. Likewise, the gray scale correction units 185-2 and 185-3 also perform the gray scale correction on the pixel value by performing calculation by Expression (2) described above.

When the non-linear conversion performed in the non-linear conversion units 182 and 184 is a logarithmic conversion, the pixel value may be subjected to the gray scale correction by performing calculation by Expression (3).

[Expression 3]

$$Ru(nl)(p) = (R(nl)(p) - L(nl)(p)) + Lu(nl)(p) \qquad (3)$$

In Expression (3), a difference value between the luminance value Lu(nl)(p) subjected to the gray scale correction and the luminance value L(nl)(p) before the gray scale correction is added to the pixel value R(nl)(p) to obtain the pixel value Ru(nl)(p) subjected to the gray scale correction.

In step S157, the non-linear reverse conversion units 186-1 to 186-3 perform the non-linear reverse conversion, which is reverse to the non-linear conversion of the non-linear conversion unit 184, on the pixel value from the gray scale correction units 185. In step S158, the non-linear reverse conversion units 186-1 to 186-3 output the pixel values Ru(p), Gu(p), and Bu(p) obtained through the non-linear reverse conversion to the gamma correction processing unit 154, respectively.

In step S159, the gray scale correction processing unit 153 determines whether all of the pixels on the RGB image of the processing target frame are processed. When the gray scale correction processing unit 153 determines that all of the pixels are not processed in step S159, that is, all of the pixels are not the processing target pixels, the process returns to step S143 to repeat the above-described processes.

On the other hand, when the gray scale correction processing unit 153 determines that all of the pixels are processed in step S159, the luminance region information calculation unit 211 (see FIG. 7) obtains the luminance region information in step S160. That is, the luminance region information calculation unit 211 calculates foot values which are the luminance values of the feet of a dark luminance side and a bright luminance side in a histogram of the luminance values of the pixels of a one-frame luminance image formed with the luminance value L(nl)(p) supplied from the non-linear conversion unit 182, and then supplies and stores the foot values as the luminance region information in the luminance region information memory 212.

In step S161, the block histogram calculation unit 213 calculates the block histogram. That is, the block histogram calculation unit 213 calculates the frequency value of the pixels of each luminance block obtained by dividing the luminance image, and then supplies and stores such a frequency value as a block histogram to the block histogram memory 214.

Figure 10:
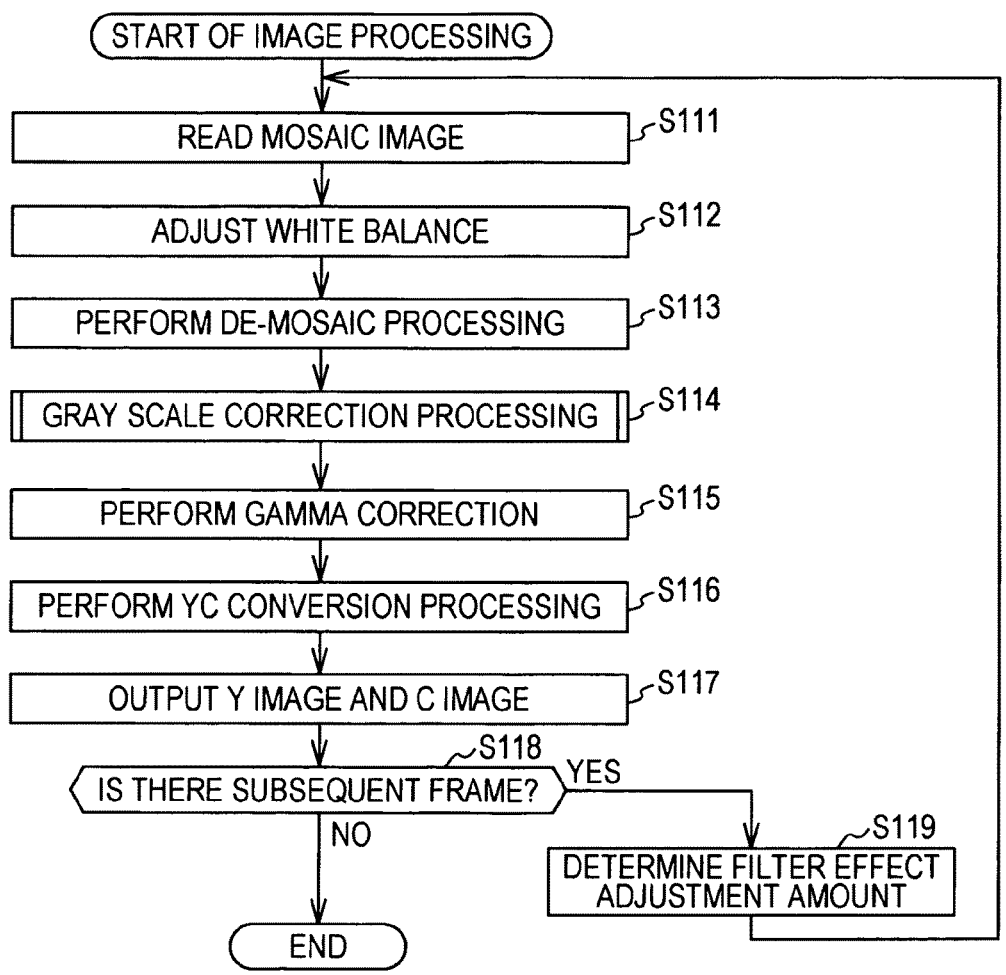
FIG. 10 is a flowchart illustrating image processing of a digital camera in FIG. 4.

In step S162, the block integral value calculation unit 215 calculates the block integral value and terminates the gray scale correction processing, and then the process proceeds to step S115 of FIG. 10. That is, the block integral value calculation unit 215 calculates the integral value (sum) of the luminance values of the pixels belonging to the luminance block for each luminance block from the one-frame luminance image formed with the luminance value L(nl)(p) supplied from the non-linear conversion unit 182, and then supplies and stores the calculated integral value as a block integral value to the block integral value memory 216.

Thus, in the gray scale correction processing, the intermediate data is calculated as the representative value based on the one-frame luminance image. When the intermediate data is calculated, the luminance region information, the block histogram, and the block integral value are stored as the intermediate data in the luminance region information memory 212, the block histogram 214, and the block integral value 216, respectively.

The luminance gray scale correction unit 183 calculates the general luminance value or the tone curve of the processing target pixel using the intermediate data calculated from the frame temporally one frame before the currently processed frame (performs edge-preserving smoothing). Therefore, even when an image to be processed is a video, the edge-preserving smoothing of a large operator's size can be performed with a smaller working memory without scanning all pixels of the image twice.

At this time, the general luminance value generated using the intermediate data and the luminance value of the current frame are blended with each other at the output ratio according to the magnitude of the variation between the currently processed frame and the frame temporally one frame before the current processed frame.

For example, when the filter effect adjustment amount of the general luminance value generated using the intermediate data is set to 1.0, the output of the bilateral filter is output without change and thus the processing can be performed using the bilateral filter. On the contrary, when the output ratio of the general luminance value generated using intermediate data is set to 0, the input luminance value is output without change, and thus the breakdown caused due to an error of the bilateral filter (the intermediate image and the image at the second step) can be prevented.

Accordingly, even when the images are different from each other between the steps in the gray scale correction processing including the plurality of steps, the deterioration in quality (error in HALO or gray scale) can be prevented. Thus, the image quality can be improved in processing a video. Moreover, the image quality can be improved without increasing the processing time in processing a still image.

Furthermore, even when the images are different from each other between the steps in the gray scale correction processing including the plurality of steps, the breakdown of an image can be prevented.

Example of General Luminance Value Calculation Process

Next, the general luminance value calculation process of step S150 in FIG. 11 will be described with reference to the flowchart of FIG. 14.

In step S211, the interpolation unit 233, the interpolation unit 234, the sum-of-product unit 236, the sum-of-product unit 237, and the filter effect adjustment processing unit 240 of the weighted sum-of-product unit 217 read the luminance value L(nl)(p) of the processing target pixel from the non-linear conversion unit 182.

In step S212, the interpolation unit 233 calculates the luminance integral value of each middle value λ of the position of the processing target pixel by interpolating the block integral value of the luminance block obtained from the space block near the processing target pixel with the luminance value L(nl)(p) from the non-linear conversion unit 182.

That is, the interpolation unit 233 sets each of 4 by 4 space blocks, that is, a total of sixteen space blocks near the processing target pixel (also including a space block including the processing target pixel) in the space direction as space blocks BKi,j (where 1≤i≤4 and 1≤j≤4), and reads an interpolation coefficient Bi,j of each of space blocks BKi,j. For example, the space weighting function maintaining unit 235 maintains the lookup table of function values of a cubic B-Spline function. The interpolation unit 233 reads a function value determined according to a relative position relationship between the position of the processing target pixel and the position of the space block BKi,j from the lookup table maintained in the space weighting function maintaining unit 235, and then sets the read function value as the interpolation coefficient Bi,j of the space block BKi,j. Moreover, the interpolation unit 233 may directly calculates the interpolation coefficient Bi,j from the cubic B-Spline function.

Next, the interpolation unit 233 sets the middle values of the luminance range of D luminance blocks obtainable from the space blocks as middle values λ1 to λD, and also sets the luminance block with a middle value λh (where 1≤h≤D) as a luminance block LBKi,j,h among D luminance blocks obtained from the space blocks BKi,j. The interpolation unit 233 reads an integral value S(i, j, λh) of each luminance block LBKi,j,h from the block integral value memory 216. Hereinafter, when it is not necessary to distinguish the middle values λ1 to λD from each other, the middle values λ1 to λD are simply called the middle values λ.

The interpolation unit 233 calculates the sum of the products of the interpolation coefficient Bi,j read for each middle value λ and a block integral value S(i, j, λ), and sets the obtained value as a luminance integral value S interpolated (λ) of the middle value λ. That is, the interpolation unit 233 calculates luminance integral value S interpolated (λ) for each middle value λ by performing calculation by Expression (4) below.

[Expression 4]

$$S\text{interpolated}(\lambda) = \sum_{i,j} B_{i,j} \cdot S(i, j, \lambda) \quad (4)$$

In Expression (4), Σ indicates a sum of block integral values S(i, j, λ) obtained by multiplying variables i and j by the interpolation coefficient Bi,j when the variables i and j are changed from 1 to 4. Therefore, the luminance integral value S interpolated(λ) is calculated by multiplying each of the block integral values S(i, j, λ) of the sixteen luminance blocks with the middle value λ among the luminance blocks obtained from the sixteen space blocks BKi,j by the interpolation coefficient Bi,j for the space block BKi,j obtained from the luminance block and by calculating the sum of the sixteen block integral values Bi,j×S(i, j, λ) by which the interpolation coefficient is multiplied.

Thus, the D luminance integral values S interpolated(λ) are calculated. The luminance integral value is a block integral value interpolated in the position of the processing target pixel for each luminance (middle value λ) corresponding to the luminance block. When the interpolation unit 233 calculates the luminance integral value, the interpolation unit 233 supplies the calculated luminance integral value to the sum-of-product unit 236.

In step S213, the interpolation unit 234 interpolates the block histogram of the luminance block obtained from the space block near the processing target pixel of the luminance value L(nl)(p) from the non-linear conversion unit 182 to calculate the luminance histogram for each middle value λ of the processing target pixel.

That is, as in the process of step S213, the interpolation unit 234 reads a function value determined by a relative position relationship between the position of the processing target pixel and the space block BKi,j from the lookup table of the space weighting function maintaining unit 235, and sets the read function value as the interpolation coefficient Bi,j of the space block BKi,j.

Then, the interpolation unit 234 reads a block histogram H(i, j, λ) of each luminance block LBKi,j,h from the block histogram memory 214. Moreover, the interpolation unit 234 calculates a value obtained by calculating the sum of the products of the interpolation coefficient Bi,j read for each middle value λ and the block histograms H(i, j, λ) and sets the obtained value as a luminance histogram H interpolated(λ) of the middle value λ. That is, the interpolation unit 234 calculates the luminance histogram H interpolated(λ) of each middle value λ by performing the calculation by Expression (5) below.

[Expression 5]

$$Hinterpolated(\lambda) = \sum_{i,j} B_{i,j} \cdot H(i, j, \lambda) \quad (5)$$

On the right-hand side of Expression (5), the block integral value S(i, j, λ) on the right-hand side of Expression (4) is replaced with the block histogram H(i, j, λ).

Thus, D luminance histogram H interpolated(λ) is calculated. The luminance histogram is a block histogram interpolated in the position of the processing target pixel for each luminance (middle value λ) corresponding to the luminance block. When the interpolation unit 234 calculates the luminance histogram, the interpolation unit 234 supplies the calculated luminance histogram to the sum-of-product unit 237.

In step S214, the sum-of-product unit 236 calculates the sum of the products of the D luminance integral values supplied from the interpolation unit 233 by the luminance weighted value, and then supplies the luminance integral values subjected to the sum of the products to the division unit 239.

That is, the sum-of-product unit 236 reads the luminance weighting function from the luminance weighting function lookup table maintained in the luminance weighting function maintaining unit 238. The sum-of-product unit 236 calculates a luminance weighted value φ(λ, L(nl)(p)) of each middle value λ using the read luminance weighting function and the luminance value L(nl)(p) and the middle value λ from the non-linear conversion unit 182.

Figure 15:
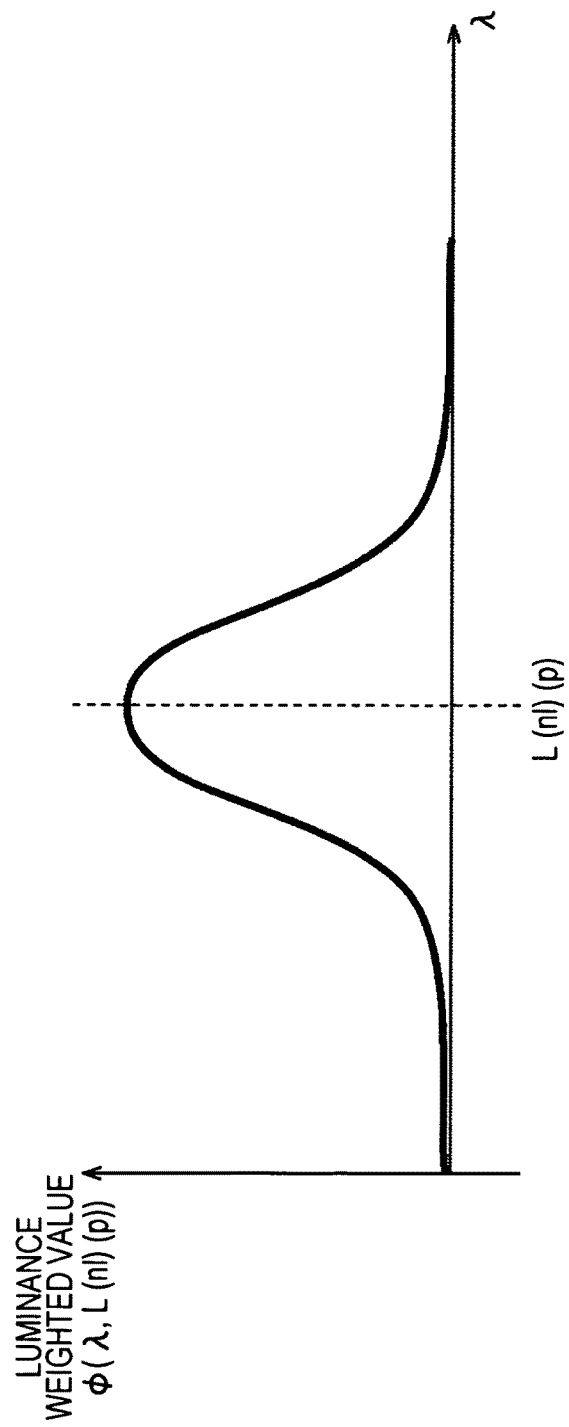
FIG. 15 is a diagram illustrating a luminance weighting function.

For example, the luminance weighting function having a form shown in FIG. 15 is maintained in the luminance weighting function lookup table maintained in the luminance weighting function maintaining unit 238. In FIG. 15, the vertical axis represents the value of the luminance weighting function, that is, the luminance weighted value φ(λ, L(nl)(p)) and the horizontal axis represents the middle value λ.

The luminance weighting function shown in FIG. 15 is a single-peaked function that has a larger value as between the luminance level corresponding to the luminance block of the luminance integral value (and the luminance histogram) interpolated in the position of the processing target pixel, that is, a difference value the middle value λ and the luminance value L(nl)(p) of the processing target pixel is smaller.

When the single-peaked luminance weighting function is used, for example, the sum-of-product unit 236 may calculate the luminance weighted value φ(λ, L(nl)(p)) of each middle value λ by performing calculation by Expression (6) instead of referring to the luminance weighting function lookup table maintained in the luminance weighting function maintaining unit 238.

[Expression 6]

$$\phi(\lambda, L(nl)(p)) = \exp\left(-\frac{(\lambda - L(nl)(p))^2}{2 \cdot \sigma th^2}\right) \quad (6)$$

In Expression (6), σth is an integer used to determine the enlarged size of the foot of the luminance weighting function and is determined in advance. The sum-of-product unit 236 calculates the luminance weighted value φ(λ, L(nl)(p)) of each middle value λ by substituting the luminance value L(nl)(p) and the middle value λ to the right-hand side of Expression (6).

In the luminance weighting function expressed in Expression (6), a large weight value is added to the middle value λ (luminance block) closer to the luminance value L(nl)(p) of the processing target pixel and a small weight value is added to the middle value λ (luminance block) distant from the luminance value L(nl)(p).

When the sum-of-product unit 236 calculates the luminance weighted value φ(λ, L(nl) (p)) of each middle value λ, the sum-of-product unit 236 multiplies the luminance integral value S interpolated(λ) of each middle value λ by the luminance weighted value φ(λ, L(nl) (p)) of each middle value λ and calculates the sum of the luminance integral values multiplied by the luminance weighted value. That is, sum-of-product unit 236 calculates the weighted sum of the luminance integral value S interpolated(λ) using the luminance weight value of each middle value λ.

The weighted sum is a sum of the block integral values of all the luminance blocks obtained from the sixteen space blocks near the processing target pixel by being multiplied by the interpolation coefficient, which is determined from the relative position relationship between the position of the processing target pixel and the position of the space block from which the luminance block can be obtained, and the luminance weighted value determined by the distance between the luminance block (middle value λ of the luminance block) and the luminance value L(nl)(p).

In step S215, the sum-of-product unit 237 calculates the sum of the products of the D luminance histograms supplied from the interpolation unit 234 and the luminance weighted value, and then supplies the luminance histograms subjected to the sum of the products to the division unit 239.

That is, the sum-of-product unit 237 reads the luminance weighting function from the luminance weighting function lookup table maintained in the luminance weighting function maintaining unit 238. The sum-of-product unit 237 calculates the luminance weighted value φ(λ, L(nl)(p)) of each middle value λ by performing calculation by, for example, Expression (6) using the luminance value L(nl)(p) and the middle value λ supplied from the non-linear conversion unit 182.

Moreover, the sum-of-product unit 237 multiplies the luminance histogram H interpolated(λ) by the luminance weighted value φ(λ, L(nl)(p)) of each middle value λ and calculates the sum of the luminance histograms multiplied by the luminance weighted value. That is, the weighed sum of the luminance histogram H interpolated(λ) is calculated using the luminance weighted value of each middle value λ.

The weighted sum is a sum of the block histograms of all the luminance blocks obtained from the sixteen space blocks near the processing target pixel by being multiplied by the interpolation coefficient, which is determined from the relative position relationship between the position of the processing target pixel and the position of the space block from which the luminance block can be obtained, and the luminance weighted value determined by the distance between the luminance block (middle value λ of the luminance block) and the luminance value L(nl)(p) in the luminance direction.

In step S216, the division unit 239 calculates the general luminance value Ll(nl)(p) by dividing the luminance integral value from the sum-of-product unit 236 by the luminance histogram from the sum-of-product unit 237. That is, the division unit 239 calculates the general luminance value Ll(nl)(p) by performing calculation by Expression (7) below.

[Expression 7]

$$Ll(nl)(p) = \frac{\sum_\lambda Sinterpolated(\lambda) \cdot \phi(\lambda, L(nl)(p))}{\sum_\lambda Hinterpolated(\lambda) \cdot \phi(\lambda, L(nl)(p))} \quad (7)$$

In Expression (7), ΣS interpolated(λ)·φ(λ, L(nl)(p)) indicates a luminance integral value, which is subjected to the sum of the products, supplied from the sum-of-product unit 236 and ΣH interpolated(λ)·φ(λ, L(nl)(p)) indicates the luminance histogram, which is subjected to the sum of the products, calculated by the sum-of-product and supplied from the sum-of-product unit 237.

The value of the weighted average of the block integral values is obtained by dividing the weighted sum obtained through weight-adding on the block integral values using the interpolation coefficient and the luminance weighted value by the weighted sum obtained through weight-adding on the block histograms using the interpolation coefficient and the luminance weighted value, and then this value is set as the general luminance value Ll(nl)(p). The general luminance value Ll(nl)(p) calculated by the division unit 239 is supplied to the filter effect adjustment processing unit 240.

In step S217, the filter effect adjustment processing unit 240 blends the general luminance value Ll(nl)(p) from the division unit 239 and the luminance value L(nl)(p) from the non-linear conversion unit 182 according to the filter effect adjustment amount from the CPU 122.

In step S218, the filter effect adjustment processing unit 240 outputs the blended luminance value as the general luminance value Ll'(nl)(p) to the tone curve calculation unit 218 and the mapping unit 220. When the general luminance value is output, the general luminance value calculation process ends, and then the process proceeds to step S151 of FIG. 11.

Thus, the weighted sum-of-product unit 217 calculates the general luminance value from the block integral value and the block histogram of the luminance block obtained from the space blocks near the processing target pixel.

The block integral value is a value obtained through integral calculation of the luminance values of the pixels of each luminance block by setting the pixels with the close luminance values as the pixels belonging to the same luminance block for each space block. The block histogram is a frequency value indicating the number of pixels belonging to each luminance block. By weighting the luminance block with the luminance level close to the luminance value of the processing target pixel and performing the sum of the products of characteristic values indicating the characteristics of the luminance block, for example, the block integral values of the luminance block, the integral result of the luminance values of the pixels close to that of the processing target pixel is obtained among the pixels of the space block near the processing target pixel.

As a consequence, it is possible to calculate the general luminance value indicating the average luminance value of a subject (which is a subject indicated by the processing target pixels), to which the processing target pixels belong, less affected by another subject with brightness different from that of the processing target pixels although integrating the luminance values of the pixels within the wide region which is made up of the sixteen space blocks near the processing target pixels.

At this time, since the calculated general luminance value and the currently input luminance value are blended with each other and are output according to the variation between the current frame and the frame temporally one frame before, it is possible to prevent an error or the like in the interpolation in terms of a level dimension and a space dimension at the rear stage of the weighted sum-of-product unit 217.

In the above description, the filter effect adjustment amount is received from the outside (that is, the CPU 122 in FIG. 5) of the weighted sum-of-product unit 217. Next, an example will be described in which the weighted sum-of-product unit 217 adjusts the filter effect according to filter calculation precision.

Another Exemplary Configuration of Weighted Sum-of-Product Unit

Figure 16:
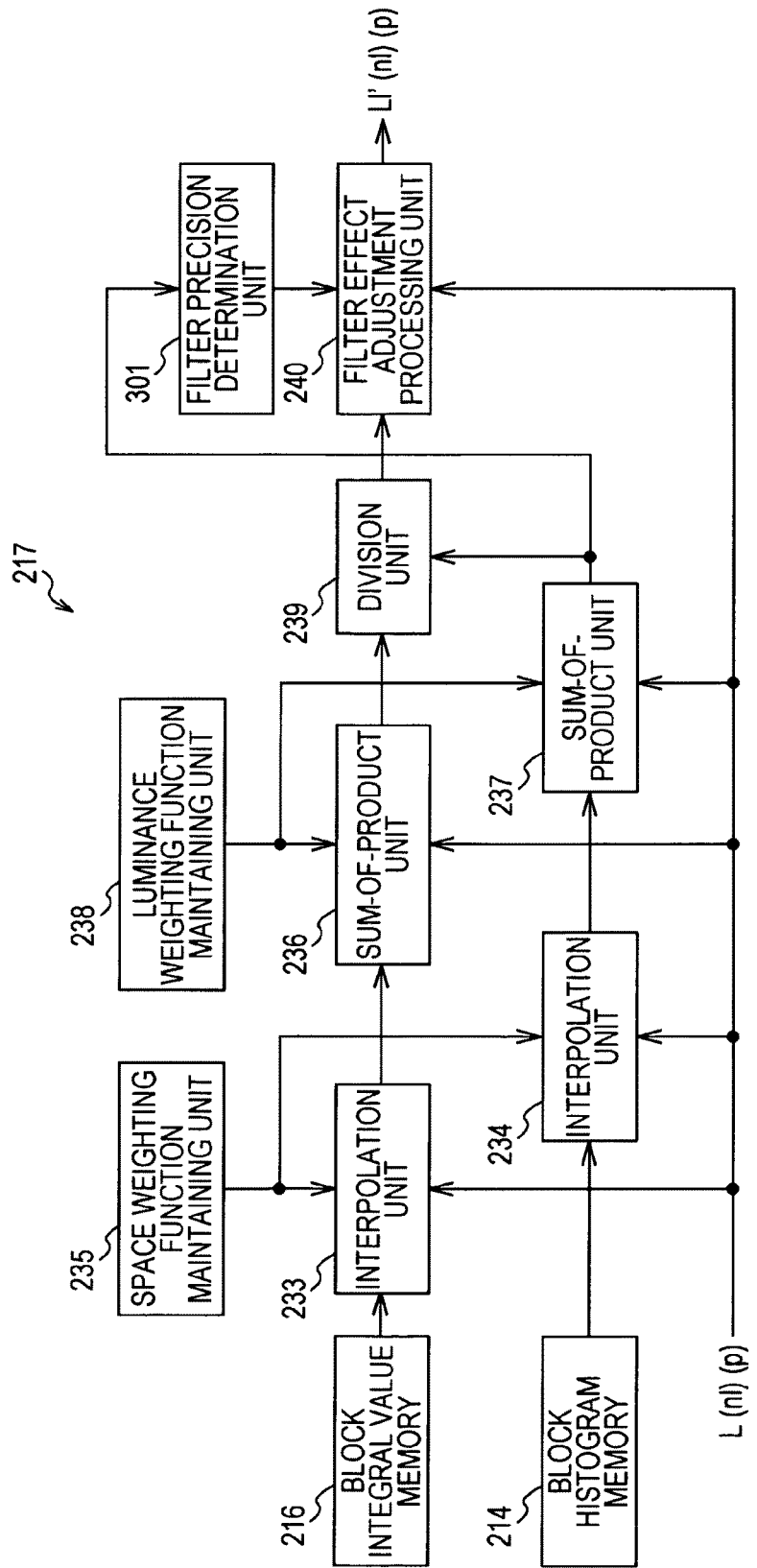
FIG. 16 is a block diagram illustrating another exemplary configuration of the functions of the weighted sum-of-product unit in FIG. 7.

FIG. 16 is a diagram illustrating another exemplary configuration of the functions of the weighted sum-of-product unit 217 in FIG. 7. As in the weighted sum-of-product unit 217 in FIG. 8, the weighted sum-of-product unit 217 in FIG. 16 includes the interpolation unit 233, the interpolation unit 234, the space weighting function maintaining unit 235, the sum-of-product unit 236, the sum-of-product unit 237, the luminance weighting function maintaining unit 238, the division unit 239, and the filter effect adjustment processing unit 240. However, the weighted sum-of-product unit 217 in FIG. 16 is different from the weighted sum-of-product unit 217 in FIG. 8 only in that a filter precision determination unit 301 is added.

That is, unlike the case of FIG. 8, the luminance histogram calculated through the sum of the products and supplied from the sum-of-product unit 237 is also supplied to the filter precision determination unit 301. The luminance histogram calculated through the sum of the products corresponds to the denominator of Expression (1) described above.

The filter precision determination unit 301 determines the filter effect adjustment amount according to the value of the luminance histogram calculated through the sum of the products. That is, the filter precision determination unit 301 has a graph, which is shown in, for example, FIG. 17, indicating a correspondence relationship between the filter effect adjustment amount and the value of the luminance histogram calculated through the sum of the products.

Figure 17:
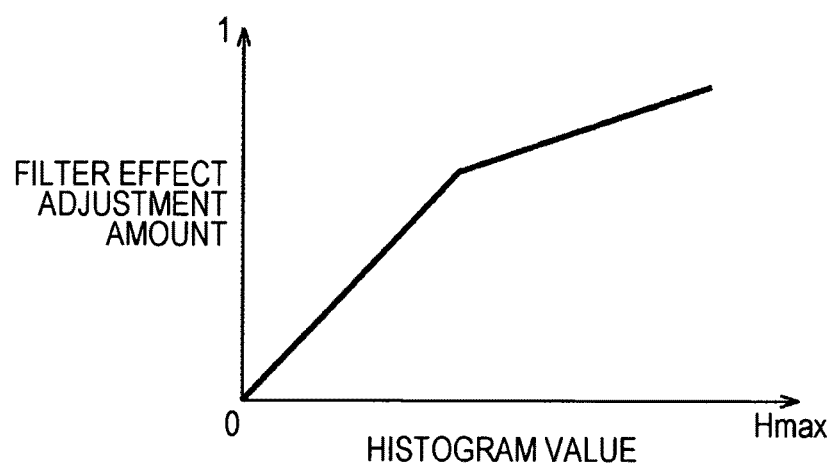
FIG. 17 is a graph of a filter precision determination unit in FIG. 16.

In the graph shown in FIG. 17, the vertical axis represents a value (0 to 1.0) of the filter effect adjustment amount and the horizontal axis represents a value (0 to the maximum value of the histogram) of the luminance histogram calculated through the sum of the products by the sum-of-product unit 237.

From the correspondence relationship of FIG. 17, it can be understood that the filter effect adjustment amount is smaller as the luminance histogram calculated through the sum of the products is smaller. On the other hand, it can be understood that the filter effect adjustment amount is larger as the luminance histogram calculated through the sum of the products is larger.

Accordingly, the filter precision determination unit 301 determines the filter effect adjustment amount so that the filter effect adjustment amount is smaller as the luminance histogram calculated through the sum of the products is smaller, and then supplies the determined filter effect adjustment amount to the filter effect adjustment processing unit 240. On the other hand, the filter precision determination unit 301 determines the filter effect adjustment amount so that the filter effect adjustment amount is larger as the luminance histogram calculated through the sum of the products is larger, and then supplies the determined filter effect adjustment amount to the filter effect adjustment processing unit 240.

The filter effect adjustment processing unit 240 blends the general luminance value Ll(nl)(p), which is the output value of the bilateral filter, from the division unit 239 with the luminance value L(nl)(p) supplied from the non-linear conversion unit 182 to the filter effect adjustment processing unit 240 according to the filter effect adjustment amount from the filter precision determination unit 301. The filter effect adjustment processing unit 240 supplies the blended luminance value as the general luminance value Ll'(nl)(p) to the tone curve calculation unit 218 and the mapping unit 220.

Next, the filter precision determination process of the filter precision determination unit 301 will be described in more detail. In a case of a bilateral filter with a configuration in which two-step processing is performed by the luminance gray scale correction unit 183, the block histogram calculation unit 213 and the block integral value calculation unit 215 first perform sampling indicated in Expression (8) below as a first step.

[Expression 8]

$$Ssmp(ps, Is) = \sum_{p \in \Omega} \omega(p - ps) \cdot \phi(I_1(p) - Is) \cdot I_1(p) \quad (8)$$

$$Hsmp(ps, Is) = \sum_{p \in \Omega} \omega(p - ps) \cdot \phi(I_1(p) - Is)$$

In Expression (8), Ssmp and Hsmp indicate the result obtained through the sampling of the numerator and the denominator of Expression (1) described above near the respective representative values (coordinates ps=(xs, ys) and a level Is), that is, the intermediate data as the representative values. Ssmp corresponds to the block histogram stored in the block histogram memory 214. Hsmp corresponds to the block integral value stored in the block integral value memory 216. The subscript 1 in Expression (8) indicates an input image at the first step.

Then, the interpolation unit 233 to the division unit 239 perform calculation by Expression (9) at a second step.

[Expression 9]

$$BLF(pc) = \frac{\sum_{ps,Is} Ssmp(ps, Is) \times \omega_{itp}(ps - pc) \times \phi_{itp}(Is - I_2(pc))}{\sum_{ps,Is} Hsmp(ps, Is) \times \omega_{itp}(ps - pc) \times \phi_{itp}(Is - I_2(pc))} \quad (9)$$

The calculated value of the bilateral filter at the second step can be obtained by interpolating the sampled signal at the first step. In Expression (9), ωipt and ϕipt are functions of the interpolation coefficient and the subscript 2 indicates an input image at the second step.

In the calculation expression of Expression (9), the calculation precision deteriorates as the denominator of the fixed decimal fraction, that is, the interpolation value of the block histogram becomes smaller.

The interpolation of the block histogram also becomes small when the image at the second step is considerably varied with respect to the image at the first step, as described above, in an edge portion of the luminance, an isolated point (luminance or a black point in the small region), and the like in the image. The example of this case will be described with reference to FIGS. 18 to 21.

Figure 18:
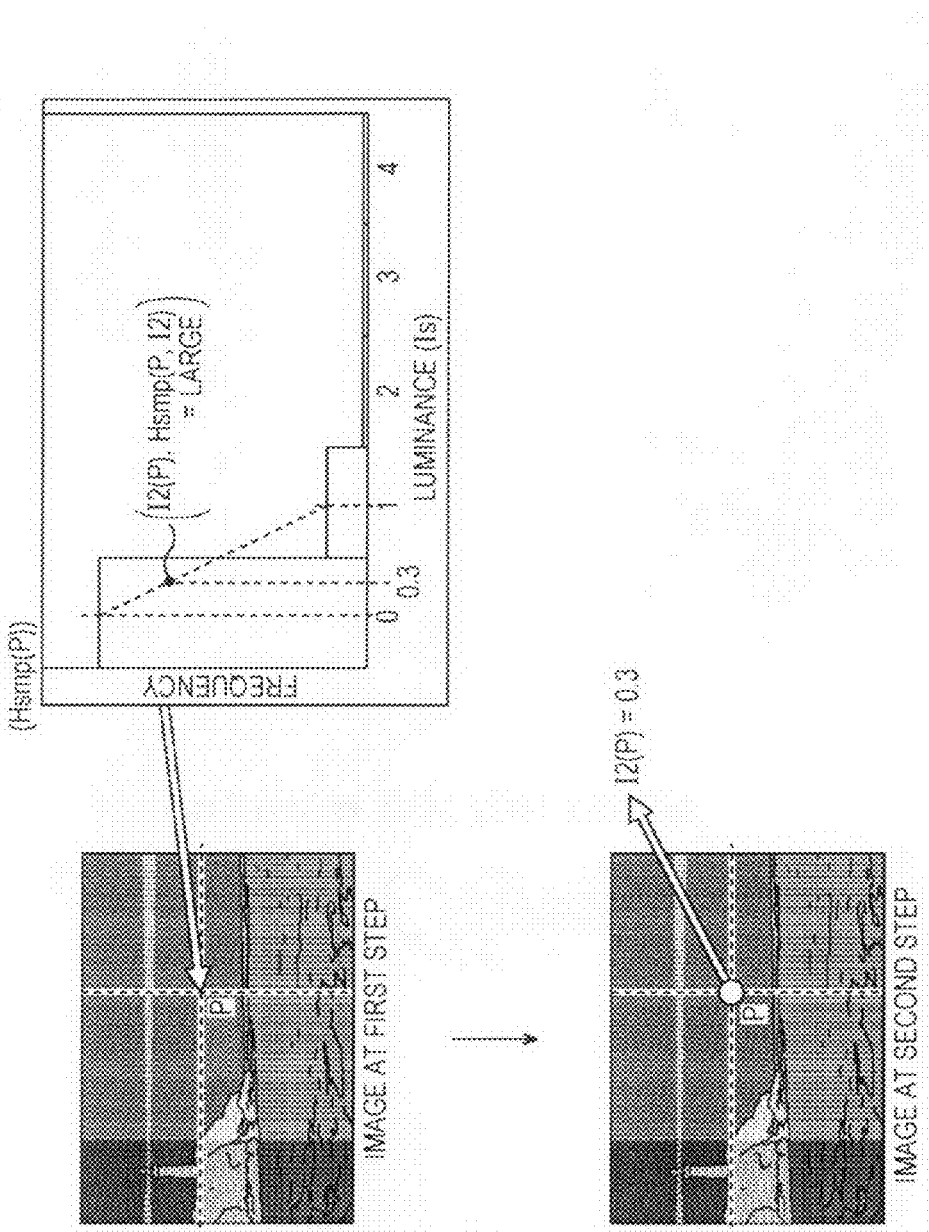
FIG. 18 is a diagram illustrating a value of a luminance histogram according to a variation amount of an input signal.

In the example of FIG. 18, the image at the first step, the image at the second step, and a block histogram Hsmp(p) are shown when the input signals are similar (close) to each other at the first and second steps.

This block histogram is a block histogram near coordinates p calculated from the image at the first step. The horizontal axis represents a luminance (Is) and the vertical axis represents a frequency.

In the example of FIG. 18, the frequency of a luminance value I1(p) near the coordinates P in the image at the first step is high near 0.3. A luminance value I2(P) of the coordinates P in the image at the second step is 0.3. Since the image at the first step and the image at the second step are similar to each other at the coordinates P, the frequency of the luminance value I2(P)=0.3 is large in the block histogram calculated from the image at the first step.

Figure 19:
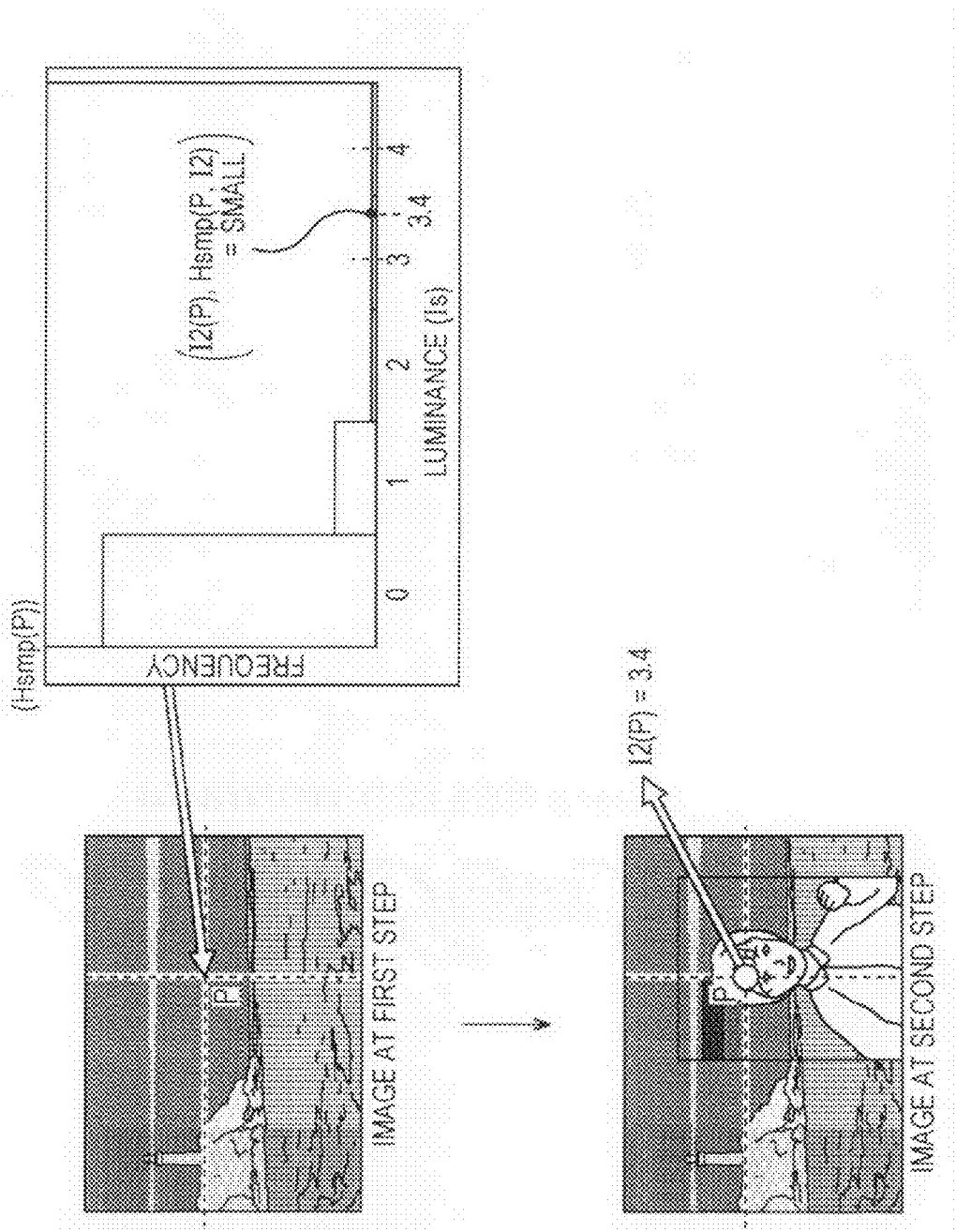
FIG. 19 is a diagram illustrating a value of a luminance histogram according to a variation amount of an input signal.

In an example of FIG. 19, a moving object crosses the inside of the screen. Therefore, the image at the first step, the image at the second step, and the block histogram Hsmp(P) are shown when the input signals are considerably different from each other at the first and second steps.

In the example of FIG. 19, since the frequency is high as to be near 0.3 which is the luminance value I1(P) near the coordinates P in the image at the first step and the face of a person which is the moving object crossing the inside of the screen is located at the coordinates P in the image at the second step, the luminance value I2(P) is 3.4. Since the image at the first step and the image at the second step are considerably different from each other at the coordinates P, the frequency of the luminance I2(P)=3.4 is small in the block histogram calculated from the image at the first step.

Figure 20:
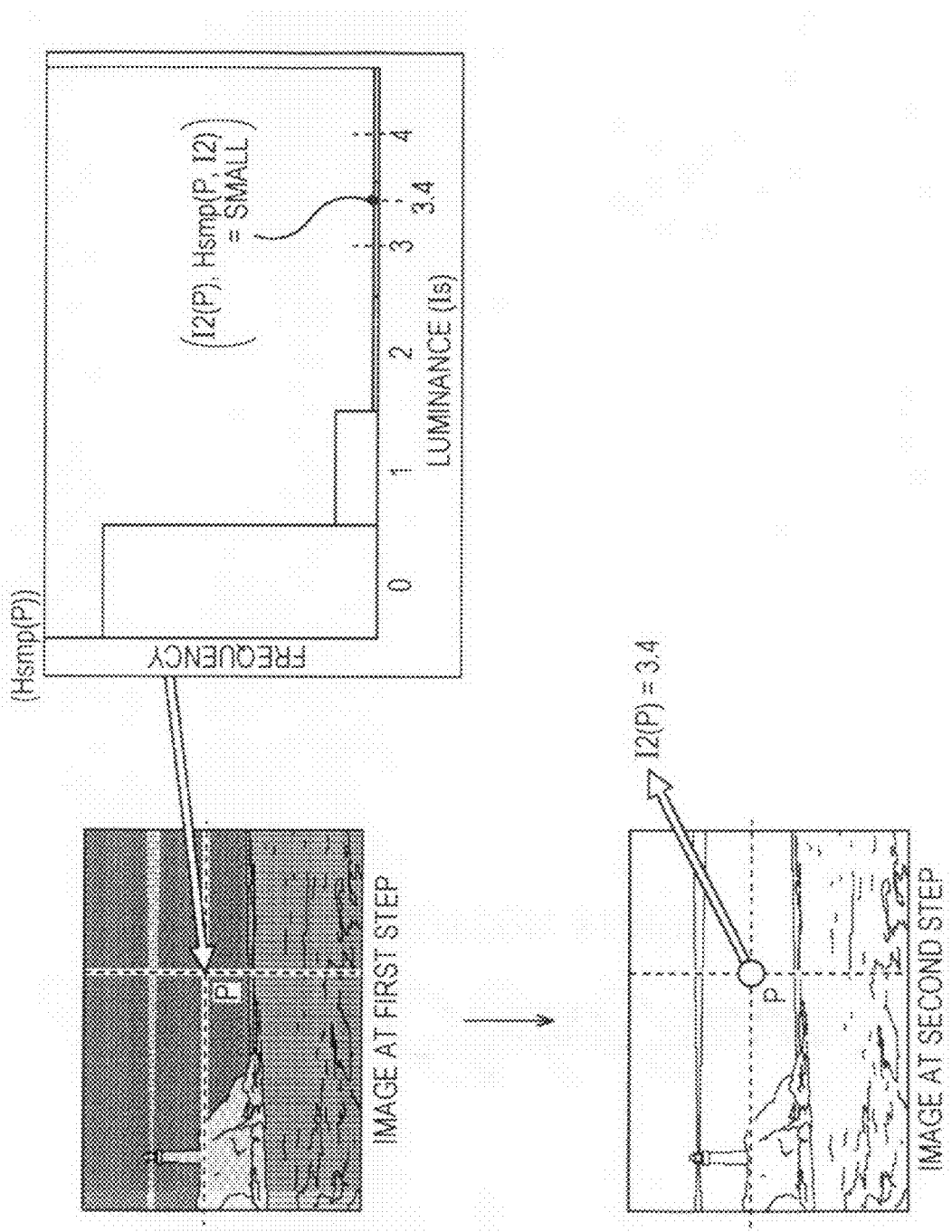
FIG. 20 is a diagram illustrating a value of a luminance histogram according to a variation amount of an input signal.

In an example of FIG. 20, the luminance of an image is considerably changed due to emitting of a flash. Therefore, the image at the first step, the image at the second step, and the block histogram Hsmp(P) are shown when the input signals are considerably different from each other at the first and second steps.

In the example of FIG. 20, since the frequency is high so as to be near 0.3 which is the luminance value I1(P) near the coordinates P in the image at the first step and the entire image at the second step becomes bright, the luminance value I2(P) is 3.4 at the coordinates P in the image at the second step. Since the image at the first step and the image at the second step are different from each other at the coordinates P, the frequency of the luminance I2(P)=3.4 is small in the block histogram calculated from the image at the first step.

Figure 21:
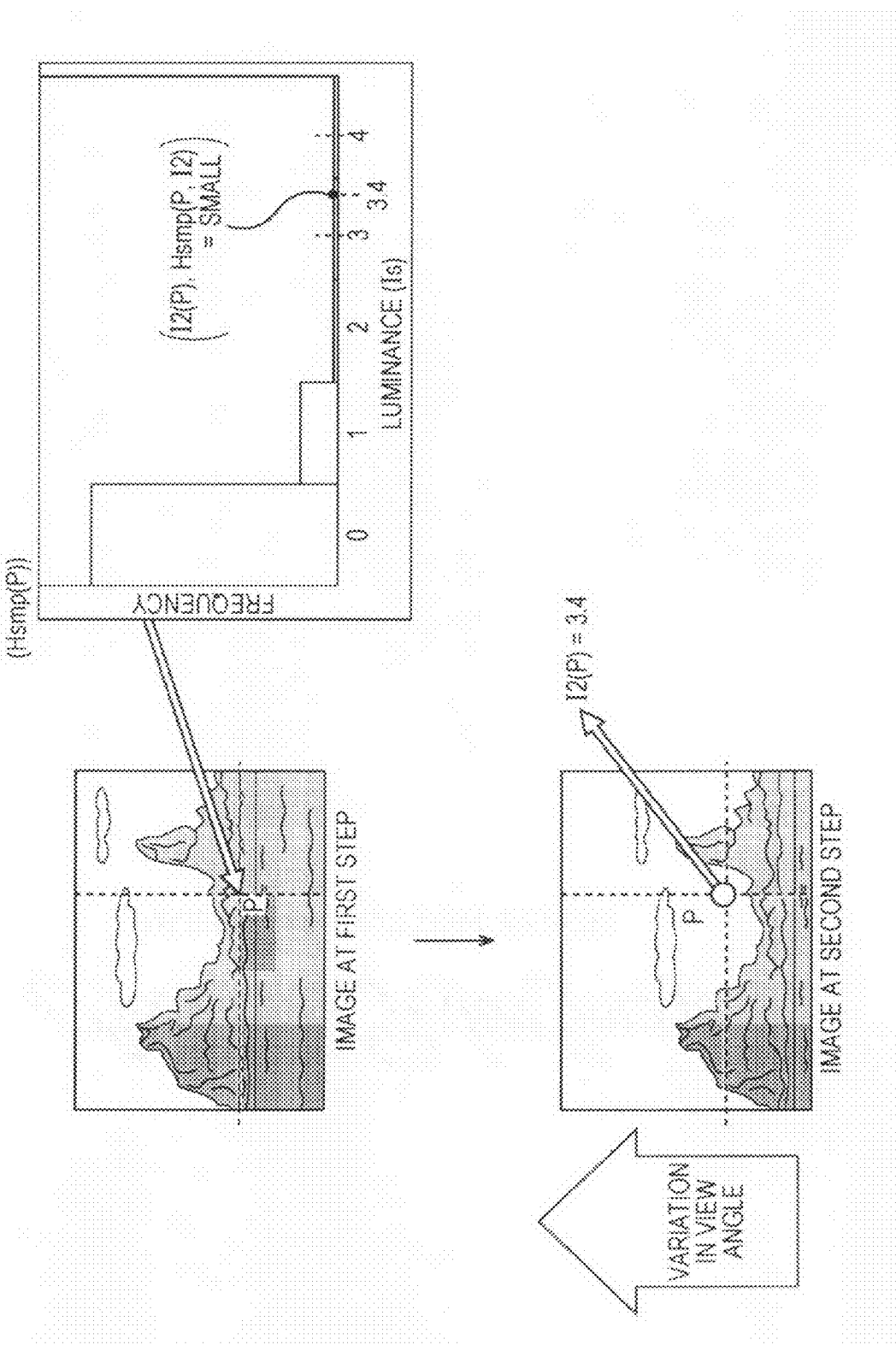
FIG. 21 is a diagram illustrating a value of a luminance histogram according to a variation amount of an input signal.

In an example of FIG. 21, a viewing angle of the image is considerably changed. Therefore, the image at the first step, the image at the second step, and the block histogram Hsmp(P) are shown when the input signals are considerably different from each other at the first and second steps.

In the example of FIG. 21, since the frequency is high so as to be near 0.3 which is the luminance value I1(P) near the coordinates P in the image at the first step and a viewing angle is changed due to upward orientation of the digital camera 101 in the image at the second step, the luminance value I2(P) is 3.4 at the coordinates P in the image at the second image. That is, the coordinates P in the image at the first step are located at the position near a mountain with low luminance, whereas the coordinates P in the image at the second step are located at the position near the sky with high luminance. Since the image at the first step and the image at the second step are different from each other at the coordinates P, the frequency of the luminance I2(P)=3.4 is small in the block histogram calculated from the image at the first step.

Thus, even when there is a large variation between the image at the first step and the image at the second image, the value of the block histogram Hsmp (P, I2) may decrease. In this case, as described above, the calculation precision may be affected and thus deteriorate.

Accordingly, the filter precision determination unit 301 determines the filter effect adjustment amount so that the filter effect adjustment amount becomes smaller as the luminance histogram calculated through the sum of the products becomes smaller, that is, as the variation is large between the image at the first step and the image at the second step.

Thus, since the calculation precision can be prevented from deteriorating, the image can be prevented from being broken down.

The example has hitherto been described in which the filter precision determination process is performed by the filter precision determination unit 301. However, the filter precision determination process may be performed by the CPU 122.

Another Example of Image Processing

Next, the image processing of the weighted sum-of-product unit 217 of the digital camera 101 in FIG. 16 will be described with reference to the flowchart of FIG. 22. Since the processes of step S311 to step S313 of FIG. 22 are the same as those of step S111 to step S113 of FIG. 10, the description thereof will not be repeated.

Figure 22:
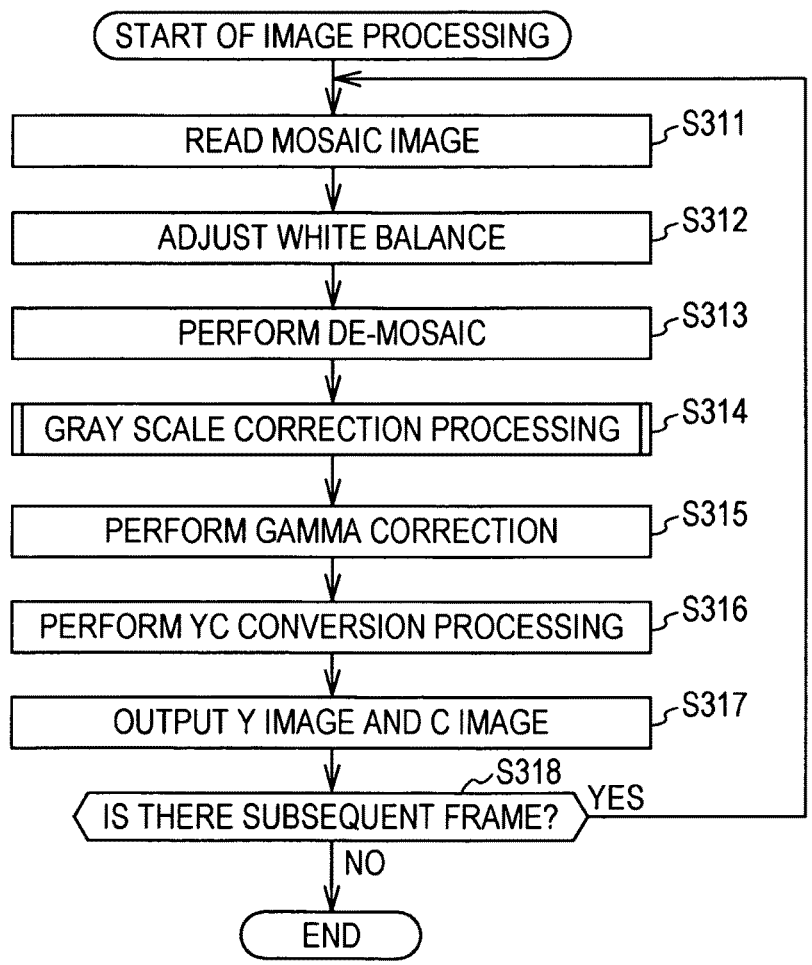
FIG. 22 is a flowchart illustrating the image processing of the digital camera in FIG. 4 in a case of a weighted sum-of-product unit in FIG. 16.

In step S314 of FIG. 22, the gray scale correction processing unit 153 performs the gray scale correction processing to correct the gray scales of the RGB image from the de-mosaic processing unit 152. At this time, the gray scale correction processing unit 153 calculates an output ratio (adjustment amount) according to a variation between the image of the currently processed frame and the image of the frame temporally one frame before and performs the gray scale correction processing on the luminance value obtained by interpolating the intermediate data generated with the image of the frame temporally one frame before and the luminance value blended with the luminance value to be processed. Then, the gray scale correction processing unit 153 supplies the RGB image subjected to the gray scale correction processing to the gamma correction processing unit 154.

Since the details of the gray scale correction processing are the same as those of the gray scale correction processing described with reference to FIGS. 11 and 12 except for the general luminance value calculation process of step S150 in FIG. 11, the description thereof will not be repeated. The different general luminance value calculation process of step S150 in FIG. 11 will be described below with reference to FIG. 23.

Moreover, since the processes of step S315 to step S318 are basically the same as those of step S115 to step S118 of FIG. 10, the description thereof will not be repeated.

That is, in step S318, the white balance processing unit 151 determines whether there is a subsequent frame. For example, the white balance processing unit 151 determines that there is a subsequent frame, when the mosaic image of the subsequent frame is accumulated in the internal memory (not shown) of the DSP 116.

When the white balance processing unit 151 determines that there is a subsequent frame in step S318, the process returns to step S311 and the mosaic image of the subsequent frame to be processed is read. On the other hand, when the white balance processing unit 151 determines that there is no subsequent frame in step S318, the image processing ends.

Example of General Luminance Value Calculation Process

Next, another example of the general luminance value calculation process of step S150 in FIG. 11 will be described with reference to the flowchart of FIG. 23. That is, the general luminance value calculation process is a process performed by the weighted sum-of-product 217 in FIG. 16.

Figure 14:
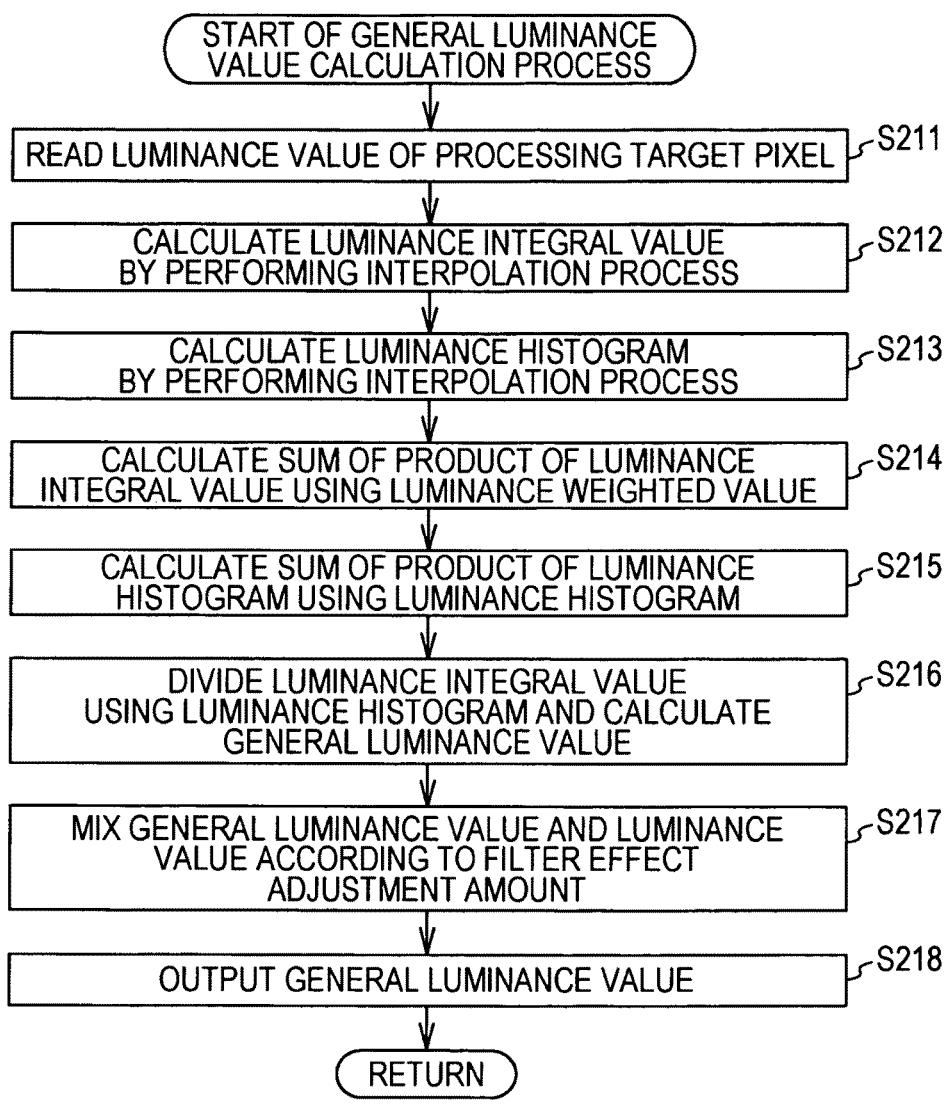
FIG. 14 is a flowchart illustrating a general luminance value calculation process of step S150 in FIG. 11.
Figure 23:
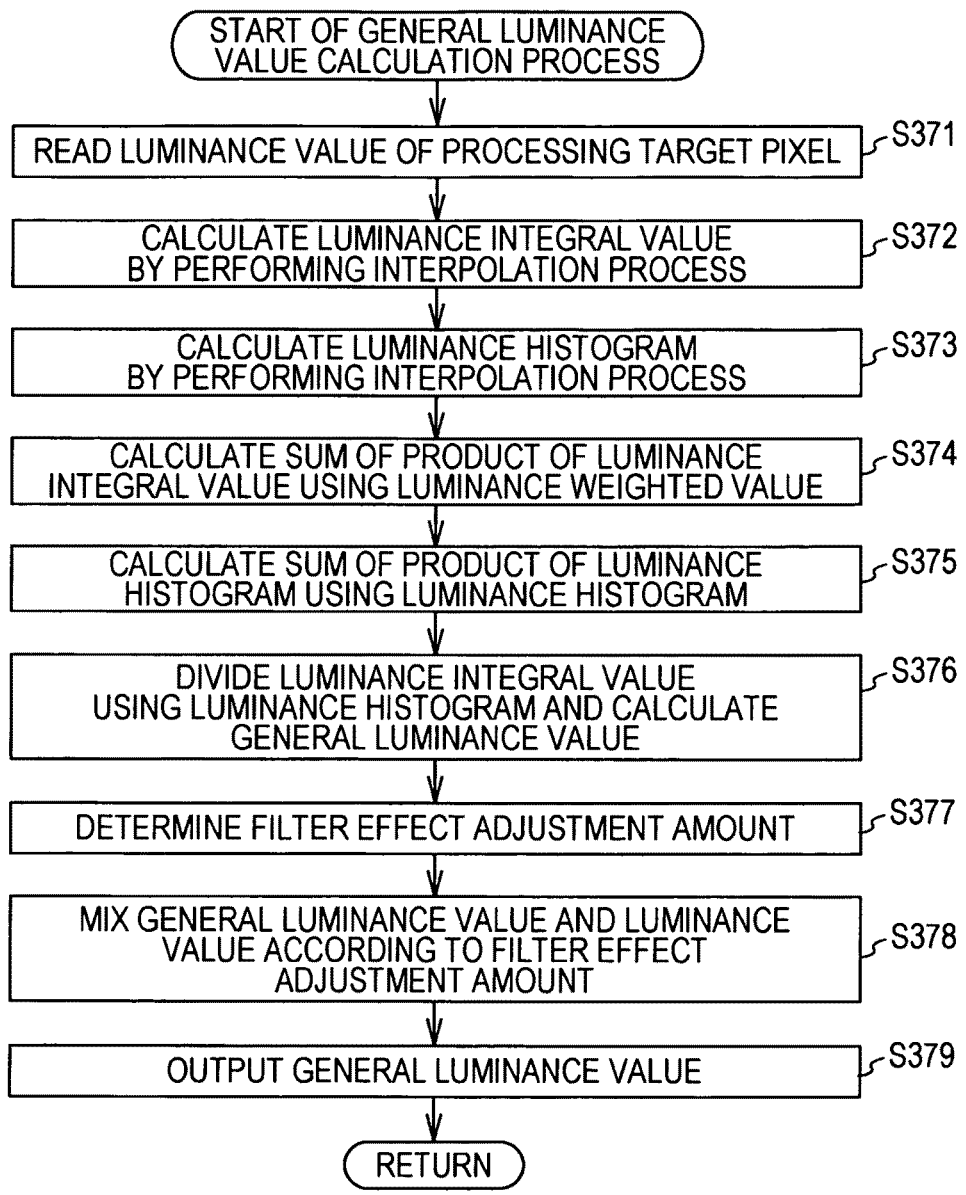
FIG. 23 is a flowchart illustrating a general luminance value calculation process in step S150 of FIG. 11 in a case of a weighted sum-of-product unit in FIG. 16.

Since the processes of step S371 to step S376 and step S378 of FIG. 23 are basically the same as those of step S211 to step S218 of FIG. 14, the description thereof will not be repeated.

That is, in step S375, the luminance histogram calculated through the sum of the products by the sum-of-product unit 237 is supplied to not only the division unit 239 but also the filter precision determination unit 301.

In step S377, the filter precision determination unit 301 determines the filter precision adjustment amount according to the size of the luminance histogram calculated through the sum of the products by the sum-of-product unit 237, that is, a variation degree of a second frame to a first frame. The filter precision determination unit 301 supplies the determined filter precision adjustment amount to the filter effect adjustment processing unit 240.

In step S378, the filter effect adjustment processing unit 240 blends the general luminance value Ll(nl)(p) from the division unit 239 and the luminance value L(nl)(p) from the non-linear conversion unit 182 according to the filter effect adjustment amount from the filter precision determination unit 301.

In this way, the luminance value obtained by interpolating the intermediate data generated and stored using the frame temporally one frame before is blended with the luminance value of the currently processed frame according to the variation (difference) between the currently processed frame and the frame temporally one frame before, and then the blended luminance value is output to the rear stage.

Thus, when there is an influence of a flash of light, when there is an influence of a moving object, or the like, the breakdown of the image which is caused due to the difference in the image between the steps is reduced or prevented.

For example, the breakdown of an image, which is caused due to the calculation precision deterioration of the bilateral filter, such as in an edge portion or an isolated point (a luminescent point or a black point in a small region) of the luminance in the image in addition to the above-mentioned influences, is reduced or prevented.

The example has hitherto been described in which the filter effect adjustment processing unit 240 blends the luminance value from the division unit 239 and the luminance value from the non-linear conversion unit 182 according to the output ratio (filter effect adjustment amount). However, the invention is not limited thereto. Instead, the filter effect adjustment processing unit 240 may be configured as a switch or the like selecting and outputting one of the luminance value from the division unit 239 and the luminance value from the non-linear conversion unit 182.

The example has hitherto been described in which the digital camera performing the gray scale correction processing is exemplified. However, the invention is not limited to the gray scale correction processing but may be applied to an image processing apparatus using a bilateral filter process.

Moreover, the invention is not limited to the above-described gray scale correction processing, the bilateral filter process, and the like. For example, the invention may be applied to an image processing apparatus or an image processing system in which two passes are processed and different images are input at first and second passes.

The above-described series of processes may be executed by hardware or software. When the series of processes is executed by software, a program implementing the software is installed in a computer. The computer includes a computer embedded with dedicated hardware and a general personal computer capable of realizing various functions by installing various programs.

Exemplary Configuration of Personal Computer

Figure 24:
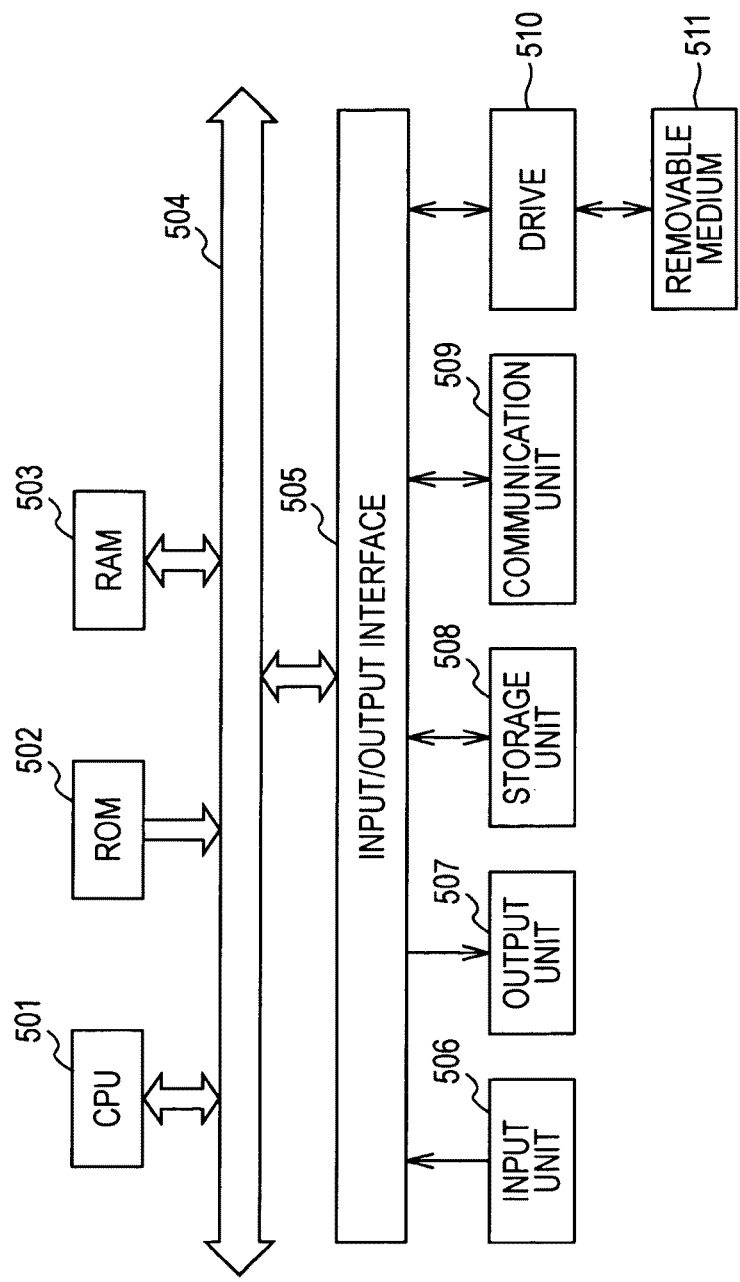
FIG. 24 is a block diagram illustrating an exemplary hardware configuration of a computer.

FIG. 24 is a block diagram illustrating an exemplary hardware configuration of a computer executing a program to realize the above-described series of processes.

In the computer, a CPU (Central Processing Unit) 501, a ROM (Read Only Memory) 502, and a RAM (Random Access Memory) 503 are connected to each other through a bus 504.

An input/output interface 505 is connected to the bus 504. An input unit 506, an output unit 507, a storage unit 508, a communication unit 509, and a drive 510 are connected to the input/output interface 505.

The input unit 506 is formed by a keyboard, a mouse, a microphone, or the like. The output unit 507 is formed by a display, a speaker, or the like. The storage unit 508 is formed by a hard disc, a non-volatile memory, or the like. The communication unit 509 is formed by a network interface or the like. The drive 510 drives a removable medium 511 such as a magnetic disc, an optical disc, a magneto-optical disc, or a semiconductor memory.

In the computer with such a configuration, the CPU 501 loads and executes, for example, a program stored in the storage unit 508 via the input/output interface 505 and the bus 504 on the RAM 503 to perform the above-described series of processes.

The program executed by the computer (CPU 501) can be provided in a recorded form in the removable medium 511 such as a package medium. Moreover, the program can be provided through a wired or wireless transmission medium such as a local network area, the Internet, or a digital broadcast.

In the computer, the program can be installed in the storage unit 508 by mounting the removable medium 511 on the drive 510 via the input/output interface 505. Moreover, the program can be received by the communication unit 509 via a wired or wireless transmission medium to be installed in the storage unit 508. Furthermore, the program can be installed in advance in the ROM 502 or the storage unit 508.

The program executed by the computer may be executed in the sequence described in the specification chronologically, may be executed in parallel, or may be executed at necessary timing, for example, when the program is called.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   representative value calculation means for calculating a representative value from an input first image signal;
   interpolation means for interpolating the representative value calculated by the representative value calculation means using a second image signal input after the first image signal;
   adjustment processing means for blending the interpolated image signal and the second image signal so that an output ratio of the image signal interpolated by the interpolation means is smaller when a variation amount of an image corresponding to the second image signal with respect to an image corresponding to the first image signal is large in comparison to a case when the variation amount is small; and
   gray scale compression processing means for receiving an output from the adjustment processing means,
   in which the adjustment processing means varies the output supplied to the gray scale compression processing means in accordance with the variation amount.

2. The image processing apparatus according to claim 1, further comprising:
   adjustment amount determination means for determining an adjustment amount of the output ratio of the interpolated image signal and an output ratio of the second image signal according to a variation amount in the image corresponding to the second image signal with respect to the image corresponding to the first image signal,
   wherein the adjustment processing means blends the interpolated image signal with the second image signal according to the adjustment amount determined by the adjustment amount determination means.

3. The image processing apparatus according to claim 2, wherein the adjustment amount determination means determines the adjustment amount of the output ratio of the interpolated image signal and the output ratio of the second image signal according to a variation amount level or coordinate of the image corresponding to the second image signal with respect to the image corresponding to the first image signal.

4. The image processing apparatus according to claim 2, wherein the representative value is calculated from a block histogram and a block sum of products.

5. The image processing apparatus according to claim 4, wherein the adjustment determination means determines the adjustment amount of the output ratio of the interpolated image signal and the output ratio of the second image signal according to a magnitude of a value of the block histogram.

6. An image processing method comprising the steps of:
   calculating a representative value from an input first image signal;
   interpolating the calculated representative value using a second image signal input after the first image signal;
   blending, by use of an adjustment processing device, the interpolated image signal and the second image signal so that an output ratio of the interpolated image signal is smaller when a variation amount of an image corresponding to the second image signal with respect to an image corresponding to the first image signal is large in comparison to a case when the variation amount is small; and
   providing an output from the adjustment processing device to a gray scale compression processing device,
   in which the adjustment processing device varies the output supplied to the gray scale compression processing device in accordance with the variation amount.

7. A non-transitory computer readable medium having stored thereon a program causing a computer to execute an image processing method comprising the steps of:
   calculating a representative value from an input first image signal;
   interpolating the calculated representative value using a second image signal input after the first image signal; and
   blending, by use of an adjustment processing device, the interpolated image signal and the second image signal so that an output ratio of the interpolated image signal is smaller when a variation amount of an image corresponding to the second image signal with respect to an image corresponding to the first image signal is large in comparison to a case when the variation amount is small; and
   providing an output from the adjustment processing device to a gray scale compression processing device,
   in which the adjustment processing device varies the output supplied to the gray scale compression processing device in accordance with the variation amount.

8. An image processing apparatus comprising:
- a representative value calculation device to calculate a representative value from an input first image signal;
- an interpolation device to interpolate the representative value calculated by the representative value calculation device using a second image signal input after the first image signal; and
- an adjustment processing device to blend the interpolated image signal and the second image signal so that an output ratio of the image signal interpolated by the interpolation device is smaller when a variation amount of an image corresponding to the second image signal with respect to an image corresponding to the first image signal is large in comparison to a case when the variation amount is small; and
- a gray scale compression processing device to receive an output from the adjustment processing device,
- in which the adjustment processing device varies the output supplied to the gray scale compression processing device in accordance with the variation amount.

* * * * *